US006513046B1

(12) United States Patent
Abbott, III et al.

(10) Patent No.: US 6,513,046 B1
(45) Date of Patent: Jan. 28, 2003

(54) STORING AND RECALLING INFORMATION TO AUGMENT HUMAN MEMORIES

(75) Inventors: Kenneth H. Abbott, III, Kirkland, WA (US); Dan Newell, Seattle, WA (US); James O. Robarts, Redmond, WA (US)

(73) Assignee: Tangis Corporation, Medina, WA (US)

( * ) Notice: Subject to any disclaimer, the term of this patent is extended or adjusted under 35 U.S.C. 154(b) by 0 days.

(21) Appl. No.: 09/464,659

(22) Filed: Dec. 15, 1999

(51) Int. Cl.[7] .............................................. G06F 17/30
(52) U.S. Cl. ................................................... 707/104.1
(58) Field of Search ........................ 707/104.1, 7, 101, 707/102; 712/23; 329/341; 341/51

(56) References Cited

U.S. PATENT DOCUMENTS 4,916,441 A    4/1990   Gombrich .................... 345/169

(List continued on next page.)

FOREIGN PATENT DOCUMENTS

| EP | 0823 813 A2 | 2/1998 |
| JP | 05260188 | 10/1993 |
| JP | 09091112 | 4/1997 |
| WO | WO 90/08361 | 7/1990 |
| WO | WO 97/03434 | 1/1997 |

OTHER PUBLICATIONS

Alexander Leonhardi, et al., Virtual Information Towers—A Metaphor for Intuitive, Location–Aware Information Access in a Mobile Environment, 3rd International Symposium on Wearable Computers, San Francisco, California, Oct. 18–19, 1999.

Anind K. Dey, et al., "The Conference Assistant: Combining Context–Awareness with Wearable Computing," 3rd International Symposium on Wearable Computers, San Francisco, California, Oct. 18–19, 1999.

Golding, Andrew and Neal Lesh, "Indoor Navigation Using a Diverse Set of Cheap, Wearable Sensors," 3rd International Symposium on Wearable Computers, San Francisco, California, Oct. 18–19, 1999.

Hisashi Aoki et al., "Realtime Personal Positioning System for a Wearable Computer," 3rd International Symposium on Wearable Computers, San Francisco, California, Oct. 18–19, 1999.

Rhodes, Bradley J., "The Wearable Remembrance Agent: A System for Augmented Memory," Proceedings of the First International Symposium on Wearable Computers (ISWC '97), Cambridge, MA, Oct. 13–14, 1997.

(List continued on next page.)

*Primary Examiner*—Diane D. Mizrahi
(74) *Attorney, Agent, or Firm*—Perkins Coie LLP

(57) ABSTRACT

A system for computer-based storing of information about a current state so that later recall of the information can augment human memories. In particular, when information about a current event of interest is to be stored, a variety of current state information of different types (e.g., video, audio, and textual information) about the environment and about a user can be acquired via sensors and other input devices. The variety of state information can then be associated together as a group and stored for later retrieval. Other information can also be associated with the group, such as one or more recall tags that facilitate later retrieval of the group, or one or more annotations to provide contextual information when the other state information is later retrieved and presented to the user. When information about a past event is to be recalled, one or more identifying recall tags can be received that are used to identify one or more state information groups that match the identifying tags. Some or all of the previously-acquired state information for the identified state information groups can then be presented to the user on appropriate output devices. Other information, such as annotations, can also be presented to the user in order to describe the state information and thus assist the user's recollection of the previous state when the information was stored.

48 Claims, 19 Drawing Sheets

U.S. PATENT DOCUMENTS

| | | | |
|---|---|---|---|
| 5,032,083 A | 7/1991 | Friedman | 434/112 |
| 5,201,034 A | 4/1993 | Matsuura et al. | 345/865 |
| 5,208,449 A | 5/1993 | Eastman et al. | 235/462.3 |
| 5,214,757 A | 5/1993 | Mauney et al. | 345/751 |
| 5,227,614 A | 7/1993 | Danielson et al. | 235/380 |
| 5,335,276 A | 8/1994 | Thompson et al. | 380/266 |
| 5,416,730 A | 5/1995 | Lookofsky | 361/680 |
| 5,470,233 A | 11/1995 | Fruchterman et al. | 434/112 |
| 5,493,692 A | 2/1996 | Theimer et al. | 455/26.1 |
| 5,506,580 A * | 4/1996 | Whiting et al. | 341/51 |
| 5,555,376 A | 9/1996 | Theimer et al. | 342/357.1 |
| 5,559,520 A | 9/1996 | Barzegar et al. | 342/357.1 |
| 5,568,645 A | 10/1996 | Morris et al. | 709/203 |
| 5,611,050 A | 3/1997 | Theimer et al. | 709/202 |
| 5,642,303 A | 6/1997 | Small et al. | 708/109 |
| 5,646,629 A | 7/1997 | Loomis et al. | 701/300 |
| 5,719,744 A | 2/1998 | Jenkins et al. | 361/683 |
| 5,726,660 A | 3/1998 | Purdy et al. | 342/357.1 |
| 5,781,913 A | 7/1998 | Felsenstein et al. | 345/169 |
| 5,790,974 A | 8/1998 | Tognazzini | 455/456 |
| 5,798,733 A | 8/1998 | Ethridge | 342/357.08 |
| 5,812,865 A | 9/1998 | Theimer et al. | 709/228 |
| 5,873,070 A | 2/1999 | Bunte et al. | 705/28 |
| 5,878,274 A | 3/1999 | Kono et al. | 710/8 |
| 5,902,347 A | 5/1999 | Backman et al. | 701/200 |
| 5,910,799 A | 6/1999 | Carpenter et al. | 345/866 |
| 5,938,721 A | 8/1999 | Dussell et al. | 701/211 |
| 5,948,041 A | 9/1999 | Abo et al. | 701/207 |
| 5,959,611 A | 9/1999 | Smailagic et al. | 345/156 |
| 5,983,335 A * | 11/1999 | Dwyer, III | 712/23 |
| 5,991,687 A | 11/1999 | Hale et al. | 701/207 |
| 6,047,301 A | 4/2000 | Bjorklund et al. | 708/139 |
| 6,064,943 A | 5/2000 | Clark, Jr. et al. | 702/2 |
| 6,108,197 A | 8/2000 | Janik | 361/683 |
| 6,294,953 B1 * | 9/2001 | Steeves | 329/341 |

OTHER PUBLICATIONS

Yezdi Lashkari, et al., "Collaborative Interface Agents," Proceedings of AAAI '94 Conference, Seattle Washington, Aug. 1994.

Maes, Pattie, "Agents That Reduce Work and Information Overload," Communications of the ACM, vol. 37, No. 7, Jul. 1994.

Juha Lehikoinen et al., "MEX: A Distributed Software Architecture for Wearable Computers," $3^{rd}$ International Symposium on Wearable Computers, San Francisco, California, Oct. 18–19, 1999.

Asim Smailagic et al., "MoCCA: A Mobile Communication and Computing Architecture," $3^{rd}$ International Symposium on Wearable Computers, San Francisco, California, Oct. 18–19, 1999.

Jie Yang et al., "Smart Sight: A Tourist Assistant System," $3^{rd}$ International Symposium on Wearable Computers, San Francisco, California, Oct. 18–19, 1999.

Gerd Kortuem, "When Cyborgs Meet: Building Communities of Cooperating Wearable Agents," $3^{rd}$ International Symposium on Wearable Computers, San Francisco, California, Oct. 18–19, 1999.

J. Bowskill et al., "Wearable Location Mediated Telecommunications; A First Step Towards Contextual Communication," $3^{rd}$ International Symposium on Wearable Computers, San Francisco, California, Oct. 18–19, 1999.

Schneider, Jay and Jim Suruda, "Modeling Wearable Negotiation in an Opportunistic Task Oriented Domain," $3^{rd}$ International Symposium on Wearable Computers, San Francisco, California, Oct. 18–19, 1999.

Lunt, Teresa F. et al., "Knowledge–Based Intrusion Detection," Proceedings of the Annual Artificial Intelligence Systems in Government Conference, IEEE Comp. Soc. Press, vol. Conf. 4, 1989, pp. 102–107.

Sato, J. et al., "Autonomous Behavior Control of Virtual Actors Based on the AIR Model," Proceedings Computer Animation, Jun. 5, 1997.

Billinghurst, Mark and Thad Starner, "New Ways to Manage Information," IEEE, pp. 57–64, Jan. 1999.

Hull et al., "Towards Situated Computing," Hewlett–Packard Laboratories, HPL–97–66 (1997).

Kirsch, Dana, "The Sentic Mouse: A Tool for Measuring Emotional Valence," http://www.media.mit.edu/affect/AC_research/projects/sentic_mouse.html [Accessed Oct. 2, 1998].

Metz, Cade, "MIT: Wearable PCs, Electronic Ink, and Smart Rooms," PC Magazine, pp. 192–193, Jun. 1998.

Oakes, Chris, "The Truman Show Realized?", http://www-.wired.com/news/news/technology/story/15745.html [Accessed Oct. 21, 1998].

Picard, R.W. and Healey, J., "Affective Wearables," Personal Technologies vol. 1:231–240, MIT Media Laboratory (1997).

Rhodes, Bradley, "WIMP Interface Considered Fatal," http://rhodes.www.media.mit.edu/people/rhodes/Papers/no–wimp.html Jul. 23, 1998.

Tan, Hong Z. and Alex Pentland, "Tactual Displays for Wearable Computing," IEEE, Massachusetts Institute of Technology Media Laboratory, pp. 84–88, 1997.

"Affective Understanding: Modeling and Responding to User Affect," http://www.media.mit.edu/affect/AC_research/understanding.html [Accessed Oct. 2, 1998].

"Alps GlidePoint," http://www.alps.com/p.17.html [Accessed Oct. 2, 1998].

"GyroPoint Technology," http://www.gyration.com/html/gyropoint.html [Accessed Oct. 2, 1998].

"Haptics," http://www.ai.mit.edu/projects/handarm–haptics/haptics.html [Accessed Oct. 2, 1998].

"Research Areas in Affective Computing," http://www.media.mit.edu/affect/ [Accessed Oct. 2, 1998].

"Research on Affective Pattern Recognition and Modeling," http://www.media.mit.edu/affect/AC_research/recognizing.html [Accessed Oct. 2, 1998].

"Research on Sensing Human Affect," http://www.media.mit.edu/affect/AC_research/sensing.html [Accessed Oct. 2, 1998].

"Smart Rooms," http://vismod.www.media.mit.edu/vismod/demos/smartromm/ [Accessed Oct. 2, 1998].

"SmartDesk Home Page," http://vismod.www.media.mit-.edu/vismod/demos/smartdesk/ [Accessed Oct. 2, 1998].

"The MIT Wearable Computing Web Page," http://wearables.www.media.mit.edu/projects/wearables/ [Accessed Oct. 2, 1998].

"Wearable Computer Systems for Affective Computing," http://www.media.mit.edu/affect/AC_research/wearables.html [Accessed Oct. 2, 1998].

* cited by examiner

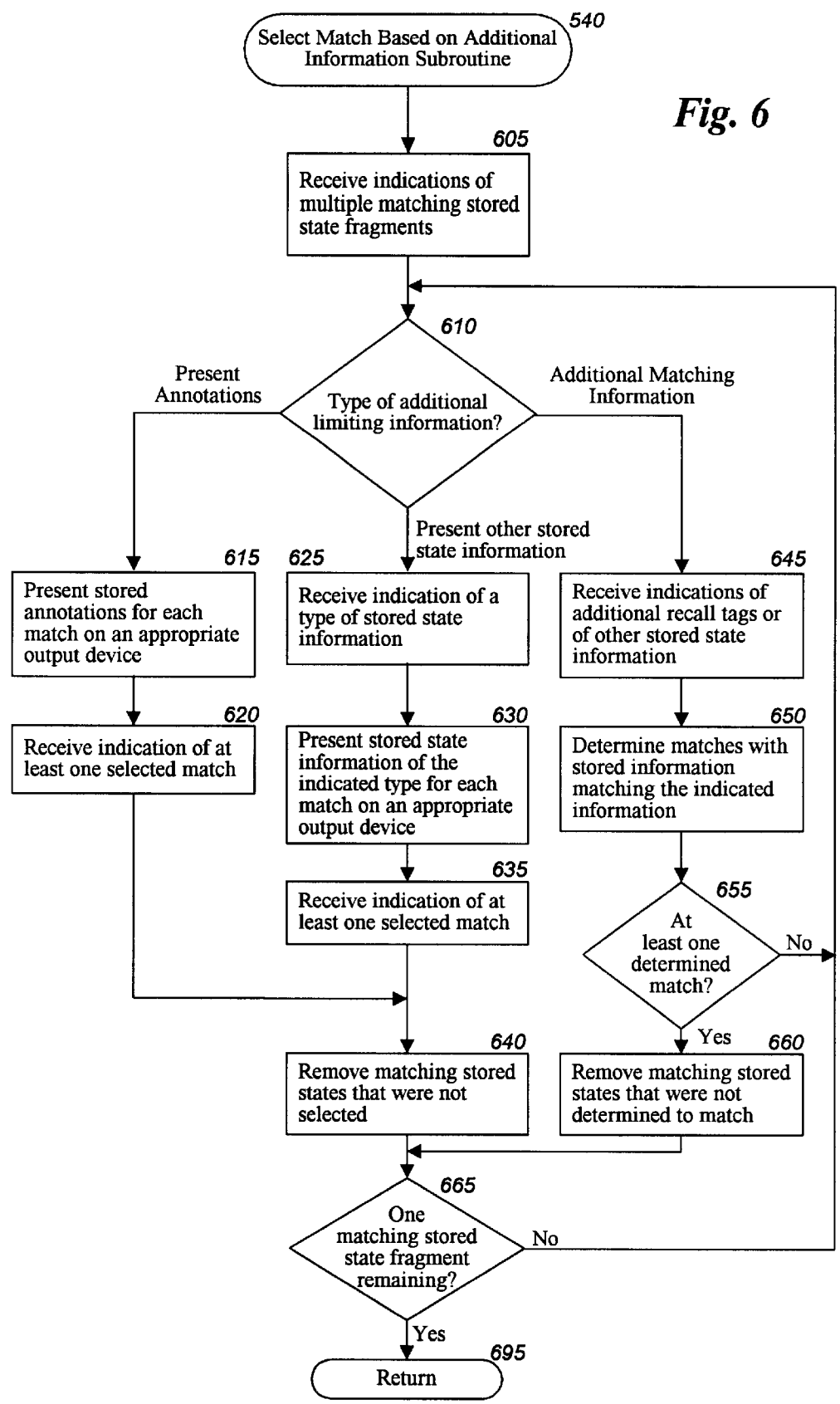

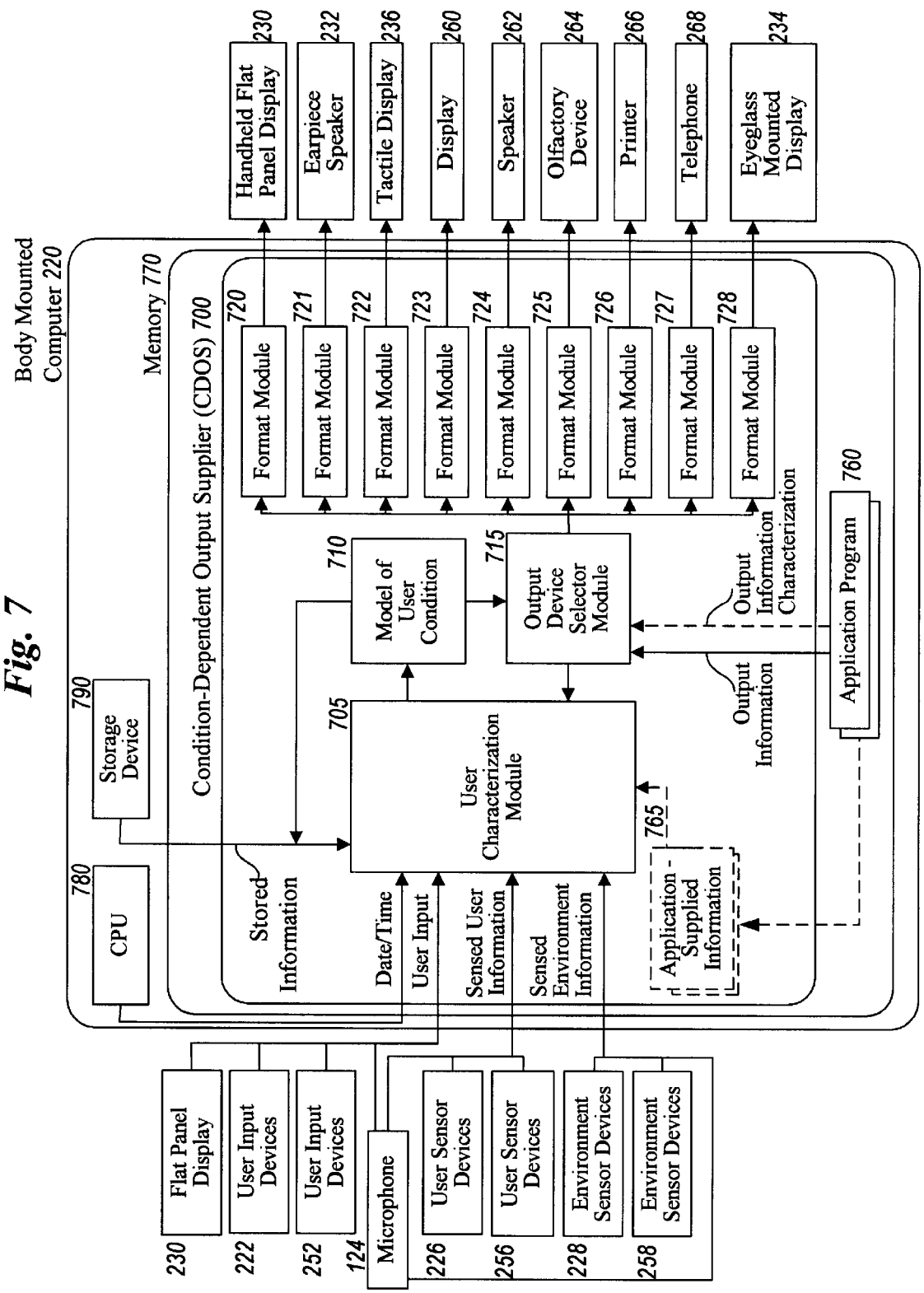

Fig. 8

| Model of User Condition | | 710 |
|---|---|---|
| User: X   Time: 14:22   Date 10/15/XX | | |
| Latitude | 37°55.3' N | |
| Longitude | 95°24.7' W | |
| Altitude | 102' | |
| Heart Rate | 57 beats/minute | |
| Blood Pressure | 125 / 80 | |
| Last User Input | Voice Command "Stop Recording" | |
| Ambient Temperature | 67°F | |
| Ambient Noise | 20 dB | |
| Location | Office | |
| Speed | 2 MPH | +/- 10% |
| Nearby Objects | Desk | |
| Nearby People | Physical: None.  Audio: "Doug Smith" | |
| | | |
| User Activity | Talking on Cell Phone, Walking | Highly Likely |
| Cognitive Load | 77 | |
| Level of Privacy | Company, Executive | |
| Scope of Audience | Self | |
| | | |
| Application X-Factor 1 | Normal: Mean-23, Std Dev 3 | |
| | | |
| User Format Preference | Visual > Auditory | |
| User Device Preference | Eyeglass Mounted Display | |

Fig. 9

User Characterization Module 705

| User: X | |
|---|---|
| IF | <Latitude> ≈ "37°55.2'N" AND <Longitude> ≈ "95°24.7'W" THEN <Location> = "Office" |
| IF | <Infrared.Link.To.Desktop> = True THEN <Nearby Objects> Includes "Desk" |
| IF | <Voice.Recognition.ID> <> "X" AND <Speakerphone.Status> = "Disabled" THEN <Nearby People> Includes ValueOf <Voice.Recognition.ID> |
| IF | <Desktop.Motion.Sensor.Human.Movement> = True AND <User Activity> Includes "Seated" THEN <Nearby People.Physical> Includes "Unidentified Person" |
| IF | <User Activity> = "Walking" THEN <Cognitive Load> = 20 |
| IF | <User Activity> = "Talking *" THEN <Cognitive Load> = 55 |
| IF | <User Activity> Includes "Walking" AND <User Activity> Includes "Talking On Cell Phone" THEN <Cognitive Load> = 77 |
| WHILE | <Output.To.User> = True THEN <Cognitive Load> = +10 |
| WHILE | <User.Mood> Includes "Angry" THEN <Cognitive Load> = +20% |
| IF | <Nearby People.*> Includes Only [Company Executives] THEN <Level Of Privacy> Includes "Executive" |
| IF | <Nearby People.*> Includes Only [Company Employees] THEN <Level of Privacy> Includes "Company" |
| IF | <Nearby People.Physical> = "None" THEN <Scope of Audience> = "Self" |
| IF | <Output.Intrusive.To.Others> = "Likely" THEN <Scope of Audience> = "Self" |
| AppX:IF | <Application X-Factor 1.Mean> > 25 THEN <Application X Output> = "Undesired" WITH Likelihood "Likely" |
| IF | (<Current.Time> - <Time.Of.Last.User.Input>) > 5 minutes THEN <Interacting.With.Computer> = False WITH Likelihood "Somewhat Likely" |
| . . . | |

Fig. 10     Output Device Selector Module 715

User: X

| Device | Currently Available | In Use | Supported Senses | Cognitive Load | Level of Privacy | Scope of Audience | Degree of Interruptibility | Degree of Intrusiveness on Others |
|---|---|---|---|---|---|---|---|---|
| Handheld Flat Panel Display 230 | X | | Visual, Audio | Very Low-Medium | All | Self [+3] | Low | Very Low |
| Earpiece Speaker 232 | X | X | Audio | Very Low-Somewhat High | All | Self | Low-Very High | Very Low |
| Eyeglass Mounted Display 234 | X | | Visual | Very Low-Somewhat Low | All | Self | Medium-High | Very Low |
| Tactile Display 236 | X | | Tactile | Very Low-Very High | All | Self | Very Low-Very High | Very Low |
| Display 260 | X | | Visual | Very Low-Somewhat High | Business, Sensitive | Self +6 | Low-Medium | Very Low-Medium |
| Speaker 262 | X | | Audio | Low-Somewhat High | Business | Many | Medium-High | Low-Very High |
| Olfactory Device 264 | X | | Olfactory | Medium-Somewhat High | Close Friends | Many | Very Low-Somewhat Low | Medium-Very High |
| Printer 266 | X | | Visual | Very Low-Very High | Business | Unlimited | Very Low | Somewhat High |
| Telephone 268 | X | | Audio | Very Low-Medium | Family | Self | High-Very High | High-Very High |
| Pager 1002 | | | Visual, Audio, Tactile | Very Low-High | All | Self | High | Medium-Very High |
| Cellular Telephone 1004 | | | Audio | Very Low-Medium | Highly Sensitive | Self | Medium-High | High-Very High |
| Car Radio 1006 | | | Audio | Low-Somewhat High | Sensitive | Self + Few | Low-High | High |
| . . . | | | | | | | | |

STORING AND RECALLING INFORMATION TO AUGMENT HUMAN MEMORIES

TECHNICAL FIELD

The present invention relates generally to computer-assisted information management, and more particularly to computer-based storing of information about a current state to facilitate later recall.

BACKGROUND OF THE INVENTION

As daily life becomes even more complex, people increasingly need to effectively manage a wide variety of types of information. In particular, people need the capability to store a broad range of types of information in such a manner that the information is easily accessible when needed.

Unfortunately, people are frequently unable to remember some types of information without assistance. For example, some types of information need to be remembered frequently, but a particular instance of the information need be retained for only a limited time (e.g., the location where the car keys were last left or the location in which the car was parked this morning). For such types of information, a typical human often remembers the information when it is later needed, but at least occasionally will be unable to remember the information. Other types of information may be difficult to remember due to the volume of information or the circumstances under which it is acquired. For example, after meeting another person, many people can remember the name and face of the person, as well as other related information (e.g., a phone number or birth month). However, after meeting a large number of people at a party, a typical human remembers such information for at most a small number of the people. In other situations, people take video recordings (e.g., a still picture or a stream of video frames) or audio recordings of information which they have perceived but cannot fully remember without assistance (e.g., of a song or of beautiful scenery). For yet other types of information, the information may be sufficiently complex or may be needed so infrequently so as to prevent mental recall (e.g, credit card and frequent flier numbers, or a rarely-used numerical value such as pi).

Due to people's inability to remember information, a variety of techniques and devices have been developed to assist people in storing and recalling information. For example, some people carry portable audio recording devices (e.g., a DICTAPHONE® device) on which audible information can be quickly stored, while others textually store information of interest on a portable medium (e.g., on a hand-held computer, on a paper-based DAY-TIMER® calendar, on POST-IT® notes, etc.). Some people may even carry video recording devices (e.g., a camera or camcorder) to record scenes or events of interest.

Unfortunately, these existing techniques and devices for storing and recalling information have various problems. Consider, for example, the situation in which a person encounters a large number of people at a party and would like to store a variety of information about each person, such as their name, face, and telephone number. Devices able to record only a single type of information, such as audio, video, or textual information, would be unable to store some of the desired information about the people encountered. If different devices were used to each store one type of information, it would be difficult to associate the different stored information and quickly retrieve the disparate pieces of information when needed. In addition, while storage devices having a linear storage mechanism (including most audio recording devices and camcorders) can quickly store large amounts of information, this form of storage mechanism makes retrieval of desired information (e.g., Bob's telephone number and face) difficult because the only available means of searching is sequential and not indexed. Moreover, each of these techniques and devices store information only at the explicit direction of a user. Thus, if a user does not recognize the need to store information while it is available, these techniques and devices will not allow the information to be later recalled. For these and a variety of other reasons, existing techniques and devices do not fully meet the needs for storing and recalling a variety of types of information.

SUMMARY OF THE INVENTION

Some embodiments of the present invention provide a method and system for computer-based storing of information about a current state so that later recall of the information can augment human memories. In particular, when information about a current event of interest is to be stored, a variety of current state information of different types (e.g., video, audio, and textual information) about the environment, a user, and the computer can be acquired via sensors and other input devices. The variety of state information can then be associated together as a group and stored for later retrieval. Other information can also be associated with the group, such as one or more recall tags that facilitate later retrieval of the group, or one or more annotations to provide contextual information when the other state information is later retrieved and presented to the user. When information about a past event is to be recalled, one or more identifying recall tags can be received that are used to identify one or more state information groups that match the identifying tags. Some or all of the previously-acquired state information for the identified state information groups can then be presented to the user on appropriate output devices. Other information, such as annotations, can also be presented to the user in order to describe the state information and thus assist the user's recollection of the previous state when the information was stored.

In one embodiment, a computer system has input devices capable of recording audio and video information and has output devices capable of presenting audio and video information. In this embodiment, a method for augmenting the memory of a user of the computer system involves receiving from the user a plurality of indications each indicating to store an augmented memory. An augmented memory is then stored for each of the plurality of received indications by recording indicated video information, recording from the user at least one audio recall tag related to a subject of the recorded video information, recording from the user at least one audio annotation providing descriptive information about the recorded video information, and associating the recorded video information, audio recall tag, and audio annotation as the stored augmented memory. When the user indicates that one of the stored augmented memories is to be recalled, a stored augmented memory is recalled by receiving from the user an indication of a subject, comparing the indicated subject to the recall tags of the stored augmented memories, and when the indicated subject matches a recall tag of one of the stored augmented memories, presenting to the user the recorded video information associated with the matched recall tag and presenting to the user the recorded audio annotation associated with the matched recall tag. Thus, the user can recall the video and annotation information associated with a stored augmented memory of an indicated subject.

BRIEF DESCRIPTION OF THE DRAWINGS

FIG. 6 is an exemplary flow diagram of an embodiment of the Select Match Based On Additional Information subroutine.

FIG. 7 is a block diagram illustrating the contents and information flow of an embodiment of a user modeling system.

FIG. 8 is an illustrative example of a model of a current user condition.

FIG. 9 is an illustrative example of a User Characterization Module.

FIG. 10 is an illustrative example of an Output Device Selector Module.

DETAILED DESCRIPTION OF THE INVENTION

The present invention provides a method and system for computer-based storing of information about a current state so that later recall of the information can augment human memories. In particular, when information about a current event of interest is to be stored, an embodiment of the Computer-Augmented Memory (CAM) system acquires a variety of current state information of different types (e.g., video, audio, and textual information) about the environment, about a user of the CAM system, and about the CAM system itself via internal and external sensors and other input devices. The CAM system then associates the variety of state information together as a group, and stores the group of state information for later retrieval. In addition to the current state information, the CAM system can also associate other information with the group, such as one or more recall tags that facilitate later retrieval of the group, or one or more annotations to provide contextual information when the other state information is later retrieved and presented to the user.

When information about a past event is to be recalled, an embodiment of the CAM system receives one or more identifying recall tags, identifies one or more state information groups that match the identifying tags, and presents to the user on appropriate output devices some or all of the previously-acquired state information for the identified state information groups. Other information, such as annotations, can also be presented to the user in order to describe the state information and thus assist the user's recollection of the previous state when the information was stored.

In some embodiments, the CAM system stores and/or recalls state information in response to explicit indications from the user, while in other embodiments the CAM system stores and/or recalls state information in response to indications generated by the system. In order to produce system-generated indications, some embodiments monitor the user and the surrounding environment, and use the monitored information to maintain one or more models of current conditions. These models enable the CAM system to determine when events of interest are occurring so that state information can be stored, as well as to determine when previously-stored state information should be recalled and presented to the user.

Figure 1:
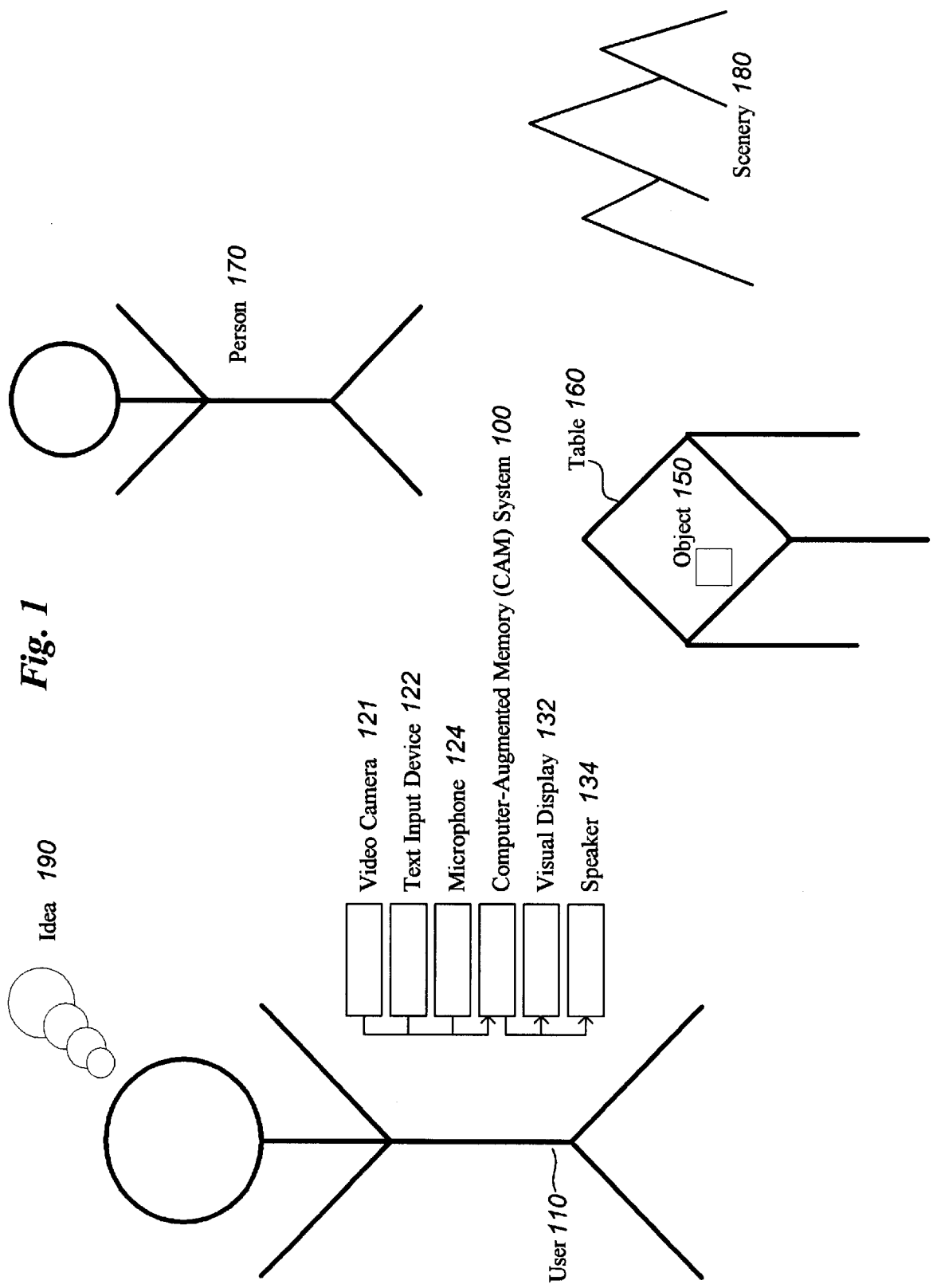
FIG. 1 illustrates a user with an embodiment of the Computer-Augmented Memory (CAM) system of the present invention.

Consider, for example, CAM system 100 being carried by user 110 in FIG. 1. In the exemplary embodiment illustrated in FIG. 1, the CAM system has access to input sensor devices video camera 121 and microphone 124, and to a text input device 122 (e.g., a keyboard or a hand-writing recognition device). The CAM system also has access to the visual display 132 and speaker 134 output devices. In some embodiments, the input and output devices may be integrated together with the CAM system into a single device, while in alternate embodiments the CAM system may be a separate device that has the ability to accept input from and provide output to (e.g., via physical or wireless connections) any of a variety of devices which may be accessible (e.g., carried by the user or located nearby in the environment).

In the example of FIG. 1, a variety of situations are illustrated for which user 110 may wish to store state information that can later augment his memory of the situation. For example, upon encountering person 170 for the first time, the user may wish to store a variety of information about the person for later recollection. In particular, the user can use the video camera and microphone to capture video and audio recordings of the encounter. The user can also use the video camera to capture other current state information about the environment which may assist in later recollection about the encounter, such as a video image of the location in which the encounter occurred. In addition, the user can use the microphone to record dictated information about the person, such as the person's name, address, e-mail address, phone number, etc. The CAM system can then store this dictated information as an audio recording, or can instead perform voice recognition on the dictation in order to produce a textual version of the information. Alternately, the user can provide some or all of the information about the person to the CAM system directly as text via text input device 121. In other embodiments, the user can provide information to the CAM system via any other available input means, such as transmitted information from a portable device (not shown) that the person might be carrying (e.g., another CAM system). After receiving and processing the various information about the encounter with the person, the CAM system associates the various received current state information together as a group, also referred to as a state fragment, that can later be recalled and made available to the user.

As another exemplary situation illustrated in FIG. 1, the user may wish to store information about a location of an object, such as the location where keys were last left or where a car is parked. In particular, the user may wish to store information about the location of object 150, such as after the user placed or saw the object on table 160. The user can use the CAM system to store a variety of information about the object, such as a picture of the object on the table (e.g., if the table's appearance is sufficiently unique to be identifying), a picture of the object that includes the surrounding setting, or an audio recording of the user describing the location of the object. Similarly, if the object is located in an environment with distinctive sounds (e.g., the airport or the zoo), the user can generate an audio recording of the surrounding environment that can later assist in identifying the location. Alternately, if the CAM system has access to a GPS receiver (not shown), the user can record GPS coordinates or an address as information about the location. Information about the location of the object can be stored in any form that is useful to the user, whether relative to another object that is known to the user (e.g., 10 meters north of Mom's favorite rose bush) or with an absolute addressing scheme (e.g., GPS coordinates or a unique street address). After receiving and processing the various information about the object, the CAM system creates a state fragment that includes the various received current state information.

In a similar manner to the encounter with person 170 and the location of object 150, the user may wish to store state information about a variety of other types of situations, such as about scenery 180 or an idea 190. Alternately, the user may wish to store state information based on other situations (not shown), such as based on information provided by the CAM system (e.g., a reminder or a notification of received email) or on information provided by another computer. For some types of situations, one or more types of environment information may not be useful in capturing the current state of the situation, such as video information being generally not useful when capturing the current state of an idea. Conversely, other types of information than environment information and user-supplied information may be useful in capturing the current state. For example, information generated by the CAM system or other computer-generated information may be useful (e.g., the current time, or inferred information about the current situation). In addition, if information about the user can be sensed or derived (e.g., body temperature or degree of exhaustion), such user information can also be stored as part of the state fragment. Those skilled in the art will appreciate that the examples shown in FIG. 1 are for illustrative purposes only, and that a variety of other types of situations and other types of information can be stored by the CAM system.

The CAM system can also perform a variety of types of additional processing for a state fragment being created. In particular, the CAM system can associate one or more recall tags with the state fragment that can assist in later retrieval of the state fragment. For example, when encountering person 170, the user may audibly or textually indicate that a name of the location (e.g., the XYZ Conference or the ABC Church) and the person's name should be recall tags for that state fragment. Alternately, if the CAM system is able to determine that information about a person is being stored, the CAM system can automatically determine to use the person's name as a recall tag. In addition, the CAM system can automatically associate other types of system-generated information as recall tags with the state fragment, such as the current date and time or an approximate age of the person based on automated face recognition.

The CAM system can also categorize the state fragment in a variety of ways that will assist later retrieval. For example, when a state fragment is created for the encounter with person 170, the user can explicitly indicate that the state fragment represents information about a person or about an encounter with a person. When the user later wants to recall information about the encounter, only state fragments that are members of those categories need be considered. More specific categories can also be used for the state fragment, such as "Action Items," as well as categories specific to the user, such as "Information From The XYZ Conference" or "Members Of The ABC Church." A state fragment can be associated with a number of different categories, and system-generated categories can be used in the same manner as are user-generated categories. If state fragment category information is available when a state fragment is to be recalled, the category information can be used in addition to or in lieu of recall tags when identifying potentially matching state fragments.

The CAM system can also associate one or more annotations with a state fragment in order to describe the state fragment or to provide contextual information about the other state information in the state fragment. For example, to accompany input device information about person 170, the user may supply an annotation such as "the vice-president of LMN Corporation" or "this was the person I sat beside on the airplane," either audibly or via text. In addition to being able to be presented concurrently with other state fragment information, the annotations can also be used in other ways. For example, when an attempt to recall a specific state fragment produces multiple possible state fragments, presentation of the annotations associated with the multiple state fragments may provide a quick way to allow the user to select between the possibilities. As with recall tags and categories, system-generated annotations can be associated with state fragments in the same manner as are user-generated annotations.

In addition to recall tags, categories, and annotations, the CAM system can associate a variety of other types of information with state fragments. For example, a retention time may be associated with a state fragment, such as "forever," "5 hours," "until recalled 3 times," or "until another instance of this type of information is stored." Similarly, an importance level may be associated with a state fragment, such as for use when prioritizing between multiple state fragments that are possible matches for a state fragment being sought. An urgency level can also be associated with a state fragment, such as to remind the user to recall the state fragment when it is in a group of possible matches, or to increase the likelihood that the system will automatically determine to present the state fragment to the user. Those skilled in the art will appreciate that these types of information can be supplied by the user or can be system-generated, and that a wide variety of other such types of information can be associated with state fragments.

Figure 2:
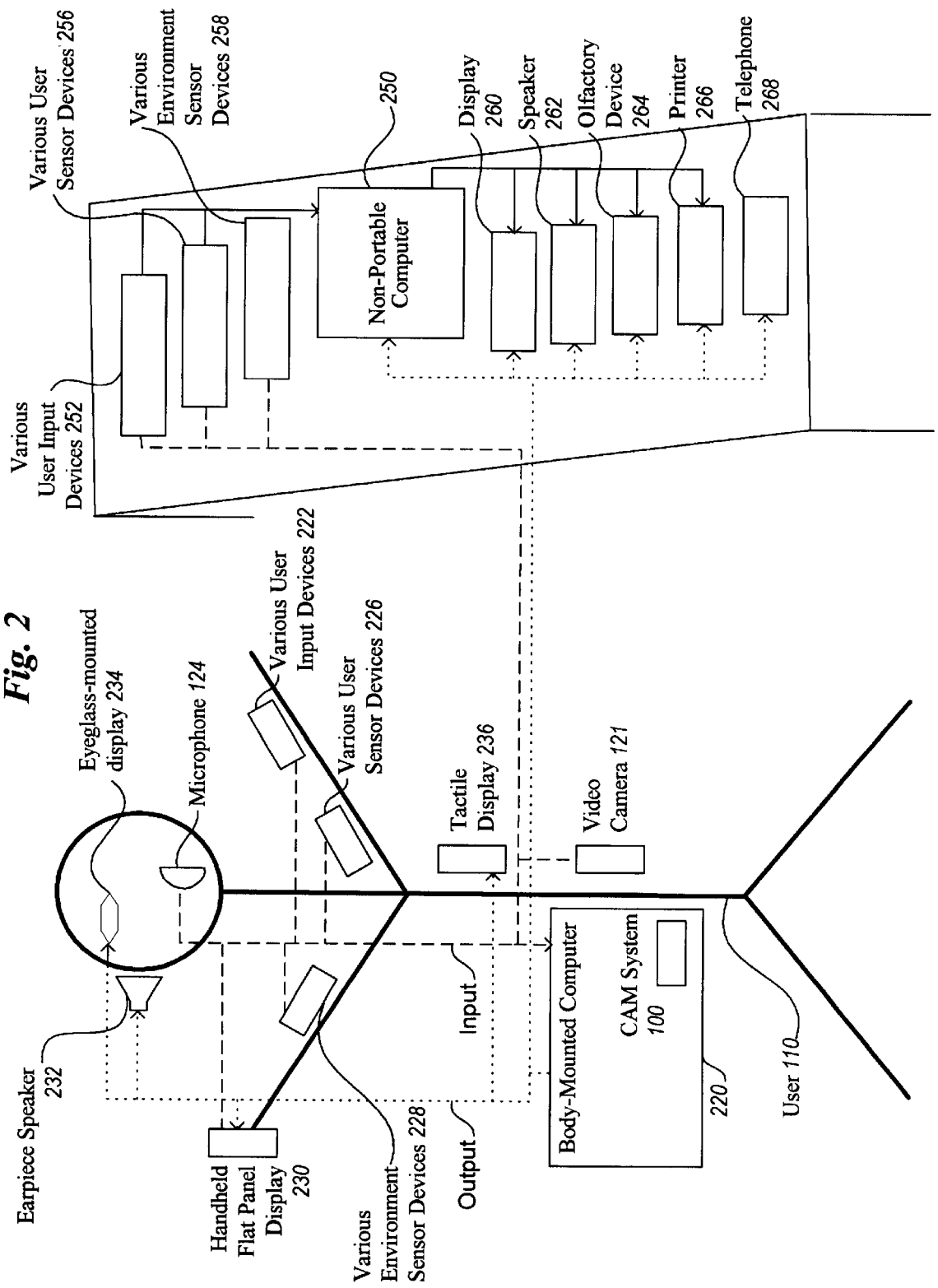
FIG. 2 illustrates a user wearing a body-mounted computer executing an embodiment of the CAM system.

FIG. 2 illustrates an embodiment of the CAM system which executes on a general-purpose body-mounted wearable computer 220 worn by user 110. Many wearable computers travel with the user, such as being strapped or attached to a user's body or clothing or being mounted in a holster. The wearable computer 220 has a variety of user-worn user input devices including a microphone 124, a hand-held flat panel display 230 with character recognition capabilities, and various other user input devices 222. Similarly, the computer has a variety of user-worn output devices that include the hand-held flat panel display, an earpiece speaker 232, an eyeglass-mounted display 234, and a tactile display 236. In addition to the various user-worn user input devices, the computer can also receive information from various user sensor input devices 226 and from environment sensor input devices 228, including video camera 121. The CAM system can receive and process the various input information received by the computer, and can present information to the user on the various output devices accessible to the computer. Thus, as the user moves about in various environments, the CAM system receives various input information from the input devices that can be stored in a state fragment when appropriate.

In the current environment, computer 220 is accessible to a computer 250 (e.g., by being in line-of-sight wireless proximity or by being reachable via a long-distance communication device such as a cellular phone) which also has a variety of input and output devices. In the illustrated embodiment the computer 250 is non-portable, although the body-mounted computer of the user can similarly communicate with a variety of other types of computers, including body-mounted computers of other users. The devices from which the non-portable computer can directly receive information include various user input devices 252 and various user sensor input devices 256. The non-portable computer can output information directly to a display 260, a speaker 262, an olfactory device 264, and a printer 266. In the illustrated embodiment, the body-mounted computer can communicate with the non-portable computer via a wireless transmission medium. In this manner, the CAM system can receive information from the user input devices 252 and the user sensor devices 256 after the information has been transmitted to the non-portable computer and then to the body-mounted computer. Alternately, the body-mounted computer may be able to directly communicate with the user input devices 252 and the user sensor devices 256, as well as with other various remote environment sensor input devices 258, without the intervention of the non-portable computer 250. Similarly, the body-mounted computer may be able to supply output information to the display 260, the speaker 262, the olfactory device 264, and the printer 266, either directly or via the non-portable computer, and directly to the telephone 268. As the user moves out of range of the remote input and output devices, the CAM system will be updated to reflect that the remote devices are not currently available.

The various input devices allow the CAM system or another system (not shown) executing on the computer 220 to monitor the user and the environment and to maintain a model (not shown) of the current conditions. Such a model can be used by the CAM system to automatically determine when an event of interest is occurring for which a state fragment should be created. For example, a user can define a rule for the CAM system that indicates that whenever the user's car is parked, a state fragment of the car location should be created. Alternately, the CAM system can learn to automatically store such information based on repeated user indications to store a state fragment just after the car has been parked. If so, the CAM system can automatically determine that the user's car has been parked in a variety of ways, such as information received from an on-board car computer, by image and audio processing that indicates that a car is being exited, or by detection that the user has stopped moving at speeds which exceed the user's ambulatory capabilities.

In a similar manner, a model of the current conditions can be used by the CAM system to automatically determine when a previously stored state fragment should be presented to the user. For example, the CAM system can detect that the user has encountered for a second time a person (e.g., based on face or voice recognition) for whom a state fragment was created of the first encounter. In this situation, the CAM system can unobtrusively prompt the user with information about the person that was previously stored, such as the person's name or an annotation indicating that the person is a potential business customer. The automatic determination of when to create or recall a state fragment will be discussed in greater detail later.

A model of the current conditions can include a variety of condition variables that represent information about the user and the user's environment at varying levels of abstraction. For example, information about the user at a low level of abstraction can include raw physiological data (e.g., heart rate and EKG) and geographic information (e.g., location and speed), while higher levels of abstraction may attempt to characterize or predict the user's physical activity (e.g., jogging or talking on a phone), emotional state (e.g., angry or puzzled), desired output behavior for different types of information (e.g., to present private family information so that it is perceivable only to myself and my family members), and cognitive load (i.e., the amount of attention required for the user's current activities). Background information which changes rarely or not at all can also be included, such as the user's age, gender and visual acuity. The model can similarly hold environment information at a low level of abstraction, such as air temperature or raw data from a motion sensor, or at higher levels of abstraction, such as the number and identities of nearby people, objects, and locations. The model of the current conditions can additionally include information added explicitly from other sources (e.g., application programs), as well as user-specified or system-learned defaults and preference information. An illustrative example of a model of current conditions containing user and environment information is described later with respect to FIG. 8.

Those skilled in the art will appreciate that computer systems 220 and 250, as well as their various input and output devices, are merely illustrative and are not intended to limit the scope of the present invention. The computer systems may contain additional components or may lack some illustrated components. For example, it is possible that the CAM system can be implemented on the non-portable computer, with the body-mounted computer replaced by a thin client such as a transmitter/receiver for relaying information between the body-mounted input and output devices and the non-portable computer. Alternately, the user may not wear any devices or computers.

In addition, the body-mounted computer may be connected to one or more networks of other devices through wired or wireless communication means (e.g., wireless RF, a cellular phone or modem, infrared, physical cable, a docking station, physical contact between two WPC users, etc.), either with or without support from other computers such as the computer 250. For example, the body-mounted computer of a user can make use of output devices in a smart room, such as a television and stereo when the user is at home, if the body-mounted computer can transmit information to those devices via a wireless medium or if a cabled or docking mechanism is available. Alternately, kiosks or other information devices can be installed at various locations (e.g., in airports or at tourist spots) to transmit relevant information to body-mounted computers within the range of the information device.

Those skilled in the art will also appreciate that specialized versions of the body-mounted computer and CAM system can be created for a variety of purposes. For example, embodiments of the CAM system can be customized for particular professions to better enable the system to automatically determine when to create and recall state fragments for members of those professions. Alternately, embodiments of the CAM system can be customized for users that have difficulty in storing and retrieving memories, such as people with Alzheimer's disease. Those skilled in the art will appreciate that a variety of such physiological conditions can be monitored, and that other specialized versions of the system can similarly be implemented.

Figure 3:
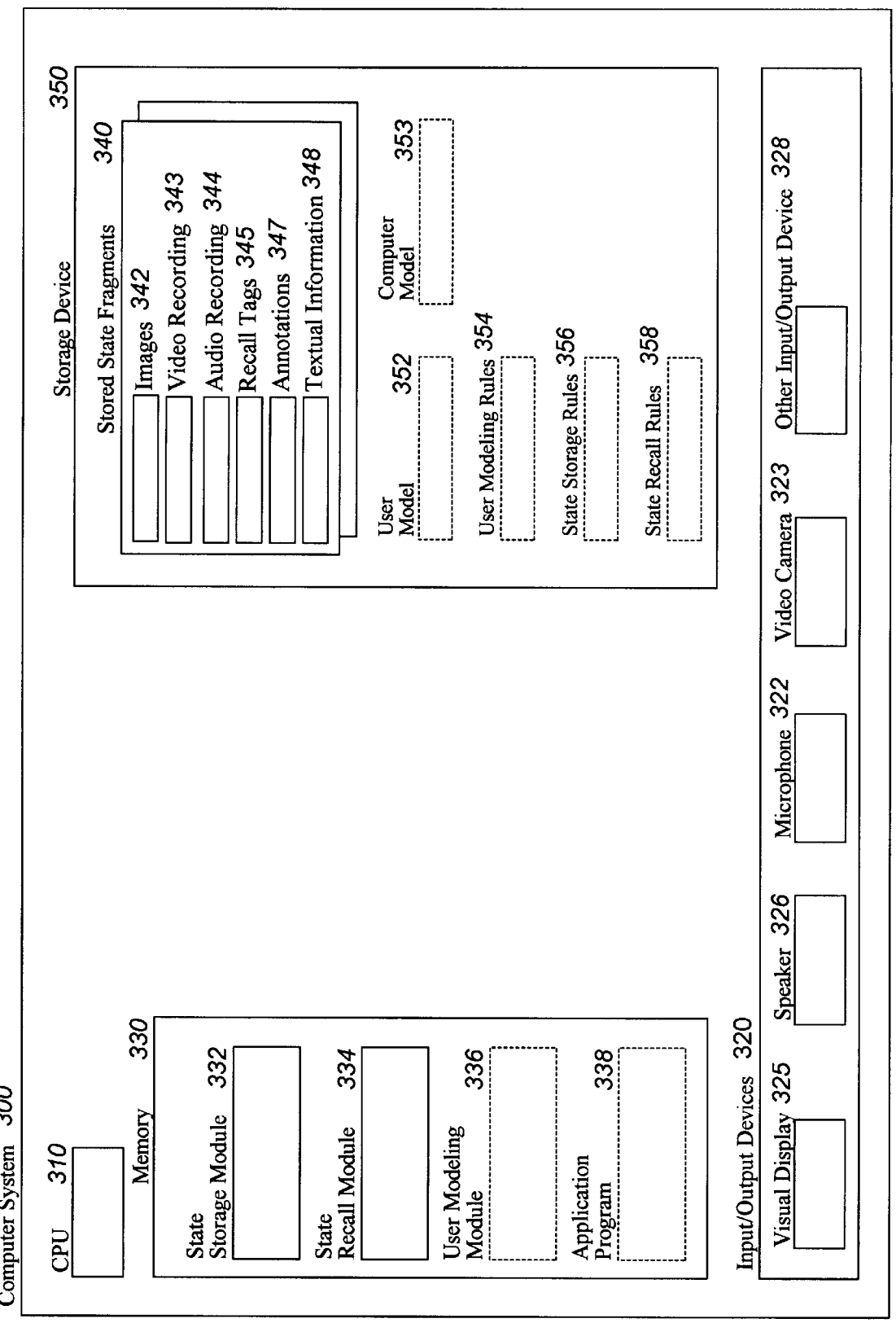
FIG. 3 is a block diagram illustrating the components of a computer system executing an embodiment of the CAM system.

FIG. 3 illustrates an exemplary computer system 300 on which an embodiment of the CAM system is executing. The computer includes a memory 330, a CPU 310, a storage device 350, and input/output devices 320, with the input/output devices including a microphone 322, a video camera 323, a visual display 325, a speaker 326, and other devices 328. The CAM system includes a State Storage Module 332 and a State Recall Module 334 that are executing in memory, and can optionally include a User Modeling Module 336 executing in memory. As various input information is received from the input devices, the information is forwarded to the executing modules. The State Storage Module uses the input information to determine when and how current state information should be stored, and creates and stores state fragments that include appropriate input information as well as related supplemental information. The State Recall Module similarly uses the input information to determine when and how previously stored state fragments should be presented to the user, and presents information to the user from stored state fragments as appropriate. The User Modeling Module uses the input information to monitor the current state of the user and the surrounding environment, and maintains a model of the current user condition.

In particular, when the State Storage Module determines that input information reflecting the current state is to be stored, the module creates a state fragment 340 on the storage device that includes some or all of the currently available input information. The input information can include explicit user input to the computer, sensed user information, and sensed environment information. The input information can also include information related to the state of the computer (e.g., battery level or information about emails stored for the user), as well as information received from other computers (e.g., from remote sensors). The module can also receive date and time information as input from the CPU or from some other source (e.g., from a model of the current computer condition), and can retrieve stored information (e.g., user preferences or a default model of the user condition) from the storage device. A variety of input information can be stored in the state fragments, including images 342, video recordings 343, audio recordings 344, and textual information 348. After creating a state fragment, the State Storage Module also associates one or more recall tags 345 and annotations 347 with the stored state fragment. Those skilled in the art will appreciate that a state fragment can include a variety of other types of information, and that state fragments can be stored in memory rather than on the storage device.

As previously discussed, in some embodiments the user of the CAM system indicates when a state fragment is to be created, what current state information is to be stored in the state fragment, and what additional information such as recall tags and/or annotations are to be associated with the state fragment. In other embodiments, the CAM system can automatically determine some or all of this information. In particular, the State Storage Module may have access to a means for analyzing information about the current state and for automatically determining when and how to store current state information, such as by using the optional State Storage Rules 356 on the storage device. For example, one of the rules may indicate that when the State Storage Module receives an indication from an on-board car computer that the car ignition has been shut off, then the system can conclude that the user has parked his car. Another rule may indicate that when it is determined that the user has parked his car, that the State Storage Module should then gather 15 seconds of video camera data along with the current time and GPS coordinates, should store this information in a state fragment categorized as "car location," and should query the user for an accompanying annotation. In this manner, the State Storage Rules can provide a means for the State Storage Module to determine when and how to store state fragments.

In addition to using the State Storage Rules to directly analyze current state information, the State Storage Module may also have access to one or more models that reflect raw and derived information about current conditions. For example, the State Storage Module may have access to a user model 352 on the storage device that contains raw and derived state information about the user and the surrounding environment. The user model may be created and maintained by the CAM system (e.g., by the User Modeling Module), or may instead be supplied by another program. Similarly, the State Storage Module may have access to a computer model 353 on the storage device that contains raw and derived state information about the computer (e.g., the current time, the amount of storage space available on the storage device, an estimate of the expected time before the batteries supplying the computer need recharging, and information about emails received). The computer model may also contain other related information, such as information about programs executing on the computer. As with the user model, the computer model may be created and maintained by the CAM system (e.g., by an optional Computer Modeling Module that is not shown), or may instead by supplied by other programs (e.g., the operating system or an external program) or by another computer.

If the State Storage Module does have access to one or more models such as the user model and the computer model, the module may be able to use the model information in conjunction with the means for automatically determining when and how to store current state information. For example, the State Storage Rules may only have a single rule that indicates how to create a state fragment when it is determined that the user has parked his car, and that rule may rely on the user model to supply information indicating when the user has parked the car. In this manner, the State Storage Rules can, rather than directly processing input information, instead be directed to more abstract concepts about a derived current state of the user.

After the State Storage Module has created and stored one or more state fragments, the State Recall Module determines when and how the information stored in the state fragments should be presented to the user. As previously discussed, in some embodiments the user of the CAM system indicates that a particular stored state fragment is to be recalled, and indicates what information from the state fragment (e.g., all) is to be presented. In other embodiments, the CAM system can automatically determine situations in which information from stored state fragments should be presented to the user. In particular, the State Recall Module may have access to a means for analyzing information about the current state and for automatically determining when and how to recall stored state information, such as by using the optional State Recall Rules 358 on the storage device. For example, one of the rules may indicate that when the user is leaving the office for the day, the State Recall Module should present to the user the video camera data from the most recent stored state fragment related to parking the car, but should not automatically present the stored time and GPS coordinate data from the state fragment. Alternately, the rule can indicate that only the annotation associated with the stored state fragment be presented to the user, or that the user should be queried as to whether the user would like to be presented with the information from the state fragment. As with the State Storage Module, the State Recall Module can also make use of information from other sources, such as the user model and the computer model, when determining whether and how a stored state fragment should be recalled.

When the User Modeling Module receives input information, it processes the information and uses the processed information to maintain an updated version of the user model. For example, the User Modeling Module may have access to the optional User Modeling Rules 354 on the storage device to use in processing the state information to maintain the user model. As discussed previously, the user model may include multiple user condition variables that reflect both raw sensor data (e.g., the user's heart rate from a pulse monitor) and derived data reflecting abstracted information about the user (e.g., a degree of user exertion or agitation based on the user's heart rate). In addition, previous versions of the user model can be made available to the User Modeling Module to assist in the continuing characterization of the user, such as to track changes over time. As described above, other modules such as the State Storage Module and the State Recall Module may also access the user model in order to make automatic determinations that depend on the current user state.

It is also possible for one or more application programs 338 to optionally supply input information to one or more of the modules, such as additional current state information to which the application programs have access or application-generated derived information about the current state. In addition, the application programs can assist the User Modeling Module in modeling the user's condition by creating new user condition variables (e.g., an indication of where the user's pupil is directed for an interactive game program), including those to be used only by that application program. Similarly, a utility program can supply user condition information that is useful to a specified subset of application programs (e.g., to various application programs from a single vendor or of a certain type).

Those skilled in the art will appreciate that when information is being processed and shared between multiple modules and systems, it is necessary for a context to be shared so that a semantic understanding of what is represented by information can be conveyed. For example, merely reporting data for air temperature as being 50 is insufficient. Not only is it unclear what scale is being used (e.g., Fahrenheit or Celsius), it is also unclear exactly what information is being represented (e.g., the air surrounding the user inside a heated room, or the outside air). Thus, the modules of the CAM system have a shared context as to the meaning of input information and user condition variables, including having consistency among the modules that generate values of condition variables in models and those that use the generated values (e.g., the State Storage Module and State Recall Module). In addition, when information from the CAM system is shared with other entities (e.g., other CAM systems), sharing of the context with these other entities enables the information to be useful. In some embodiments, other systems are designed to share the same context (e.g., via a published API), while in other embodiments additional information describing the shared information can be supplied along with the shared information to establish a shared context.

Those skilled in the art will also appreciate that, for each of the modules performing automated processing of current state information in order to determine when to take actions or to make conclusions about the current state, there are a variety of techniques for combining different types of input information and processing it to generate output information. As indicated above, some embodiments of the CAM system may use rules such that when a test portion of a rule is currently true, then the result portion of the rule is activated or performed (e.g., to cause the value of a condition variable to be modified, to activate an input device to record information, or to satisfy the test portion of other rules). For example, a rule can indicate that if the user is talking or the surrounding environment is loud, then non-auditory output is preferable to auditory output. When this first rule was satisfied, the result can trigger the satisfaction of a second rule, such as a rule stating that while non-auditory output is currently preferable then an eyeglass-mounted display device will be used for output. Alternately, a second rule can state that although non-auditory output is currently preferable, an earpiece speaker device will be used for highly sensitive information. Techniques other than using rules that can be used by other embodiments of the CAM system include look-up tables, neural networks, expert systems, genetic algorithms, probabilistic belief networks, etc.

Figure 4:
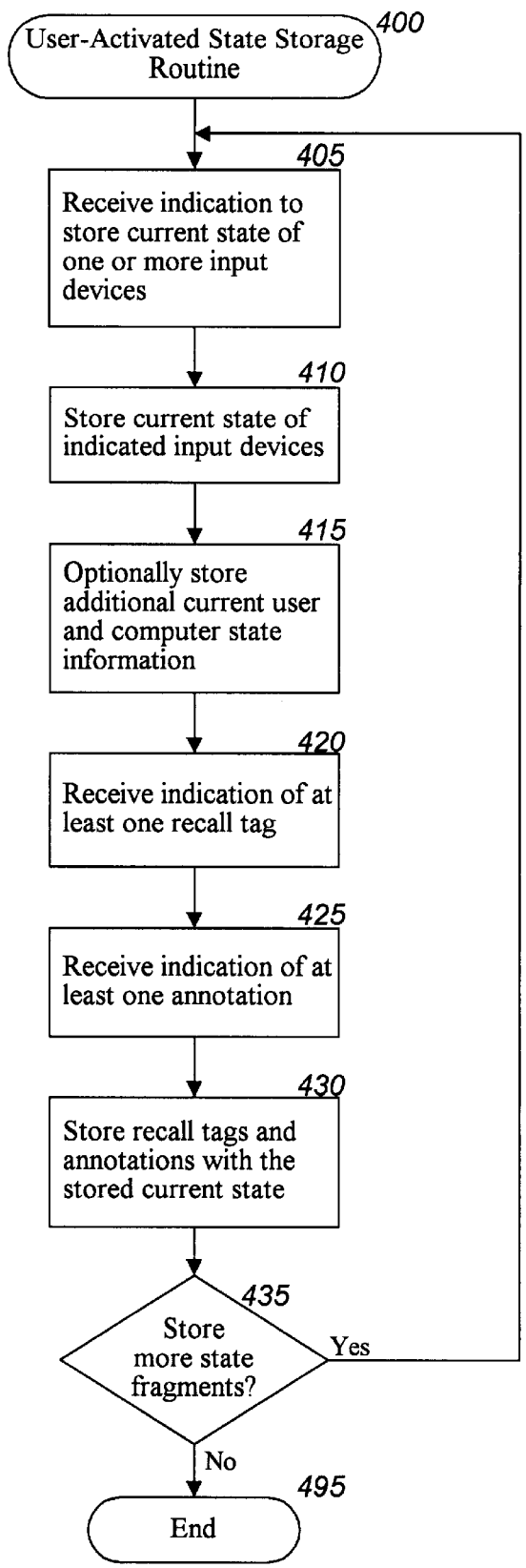
FIG. 4 is an exemplary flow diagram of an embodiment of the User-Activated State Storage routine.

FIG. 4 is an exemplary flow diagram of an embodiment of the User-Activated State Storage routine 400. The routine receives indications from the user when an event of interest is occurring for which state information should be stored, retrieves a variety of current state information from input devices, receives additional information to be associated with the retrieved information, and stores all of the information as a state fragment that is available for later retrieval.

The routine begins at step 405 where an indication is received from the user to store a state fragment having the current state of one or more input devices. The indication to create a state fragment can be made explicitly by the user (e.g., pressing a hardware button or selecting a displayed menu option), or can instead be made implicitly by having the user manually activate one or more input devices (e.g., pointing the video camera in a direction of interest and activating the recording mechanism). The current state to be stored can include environment information that can be detected by a sensor input device, and user-supplied information on a user input device. After step 405, the routine proceeds to step 410 where the current information available to the indicated input devices is captured, and a state fragment is created that contains the input information. The routine can use defaults for details such as how long to record information from the various input devices, or the user can instead specify such information or manually stop the recording when desired. For input devices that receive information in a directional manner, such as a video camera that receives information in the direction that the video camera is pointing, the system can merely record whatever information is available to the device and rely on the user to direct the device appropriately, can remind the user to direct the device appropriately, or can manipulate the device itself in an appropriate direction if the system can so manipulate the device.

The routine then continues to step 415 to determine other current state information that should be stored along with the input information. For example, information about the user or the user's environment (e.g., from a user model) or information about the computer (e.g., from a computer model) may be selected as current state information to be stored in the state fragment. The selection of other information can be made in a variety of ways, such as based on explicit user input or instead on user preferences. The routine next continues to step 420 to receive from the user an indication of one or more recall tags to be associated with the state fragment. Those skilled in the art will appreciate that virtually any type of information can be used as a recall tag, such as an audio or video recording, text information, a digital ink representation of handwriting, a still video image or camera bitmap, etc. In addition, recall tags can represent a variety of types of information, such as current surroundings (e.g., a photo of the environment), past surroundings (e.g., a sequential series of past locations), abstract associations (e.g., a user-generated label), etc. After step 420, the routine continues to step 425 to receive from the user an indication of one or more annotations to be associated with the state fragment. As with the recall tags, a variety of types of information can be used as annotations. The routine next continues to step 430 to associate the recall tags and annotations with the other stored state fragment information. The routine then continues to step 435 to determine if there are more state fragments to be created. If so, the routine returns to step 405, and if not the routine continues to step 495 and ends.

Those skilled in the art will appreciate that additional types of information can be stored or associated with stored state fragments, such as category information, an importance level, an urgency level, a retention time, etc. Similarly, in some embodiments some of the indicated information may not be included with the state fragment, such as recall tags or annotations. In addition, some of information to be included in the stored state fragment can be indicated by the user, while other information to be included can be automatically determined by the CAM system. The routine can also index the stored state fragments in one or more ways to facilitate later retrieval of the state fragments. For example, a mapping can be created from the various recall tags to the stored state fragments with which they are associated so that those state fragments can be quickly identified when one of those recall tags is later specified. Alternately, if category information is available for a stored state fragment, the state fragment can be associated with those categories to facilitate later retrieval of state fragments belonging to such categories (e.g., by creating a category mapping of category types to corresponding state fragments, or by physically storing a copy of the state fragment in a location designated for that category). Those skilled in the art will also appreciate that, while in the described embodiment information is gathered and stored in the state fragment in a specified sequential order, in other embodiments information may be gathered and stored simultaneously or in a different order.

Figure 5:
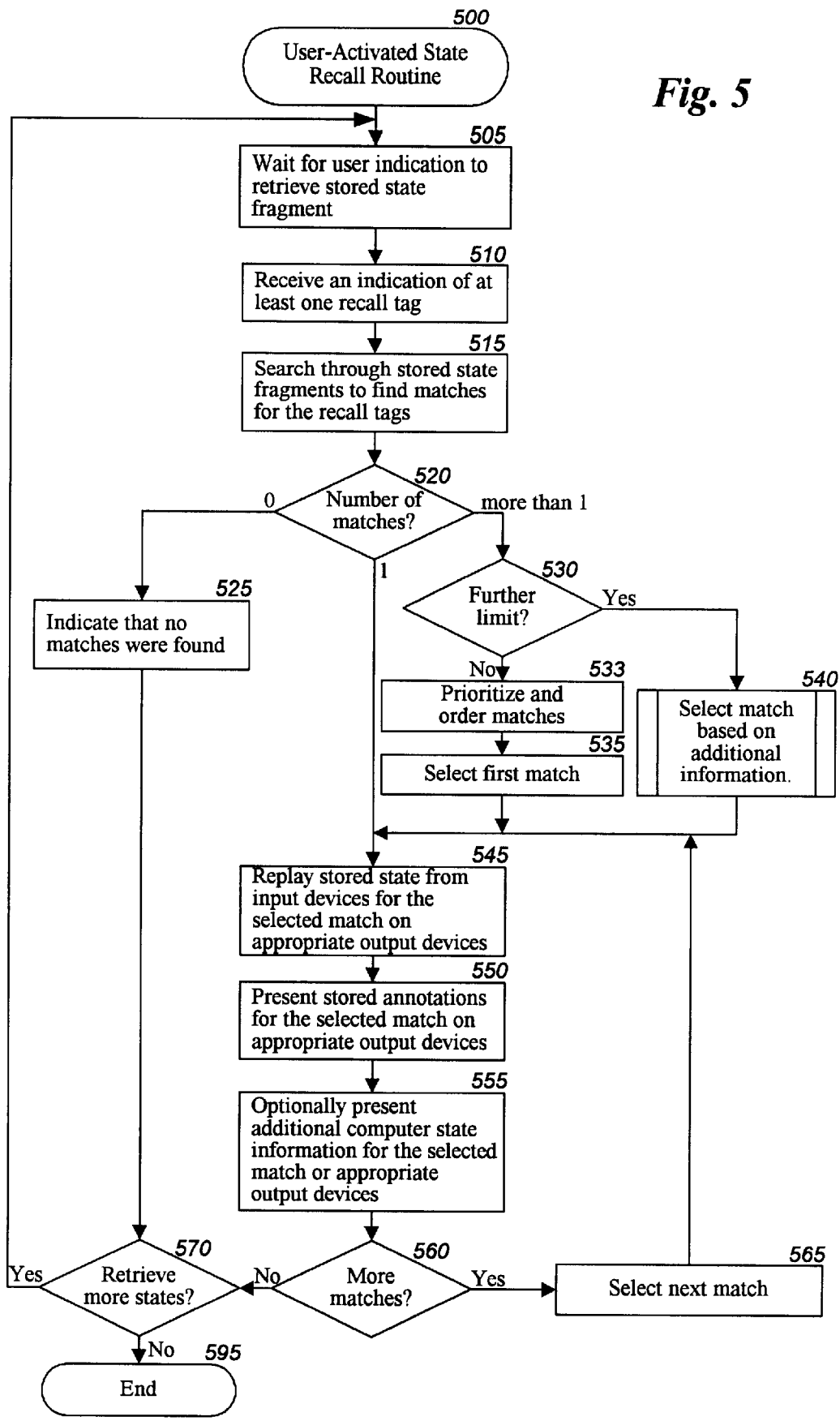
FIG. 5 is an exemplary flow diagram of an embodiment of the User-Activated State Recall routine.

FIG. 5 is an exemplary flow diagram of an embodiment of the User-Activated State Recall routine 500. The routine receives a user indication to recall a stored state fragment matching one or more supplied recall tags, identifies stored state fragments which potentially match the supplied recall tags, and then presents to the user some or all of the stored state information from the identified state fragments.

The routine begins at step 505 where the routine waits to receive from the user an indication to retrieve a stored state fragment. After such an indication is received, the routine continues to step 510 to receive an indication from the user of at least one recall tag. The routine then continues to step 515 to identify stored state fragments that match the supplied recall tags, such as by searching through all stored state fragments or by using indexing information to identify relevant state fragments. Those skilled in the art will appreciate that a variety of types of information can be supplied as recall tags. For example, textual information can be supplied to match stored textual recall tags. Alternately, an audio recall tag can be supplied to match either stored audio recall tags (e.g., by direct comparison of recordings) or stored textual recall tags (e.g., by performing voice recognition on the supplied audio recall tag). In addition, rather than merely matching supplied recall tags to stored recall tags, alternate embodiments can match supplied recall tags with any information stored in a state fragment or with other information associated with a state fragment (e.g., an annotation). Those skilled in the art will also appreciate that varying degrees of match between a supplied recall tag and an existing recall tag may exist. In some embodiments, only perfect matches will be treated by the routine as being a match, while in other embodiments a match threshold may be used, and in yet other embodiments all matches that have a non-zero degree of match may be treated as possible matches.

After step 515, the routine continues to step 520 to determine the number of stored state fragments that were determined to match the supplied recall tags. If no matches were found, the routine continues to step 525 to indicate that information to the user, and then continues to step 570. If more than one match is found, the routine continues to step 530 to determine whether the group of possible matching stored state fragments should be limited to a single state fragment before information is presented to the user, or if instead information from all of the matching state fragments should be presented to the user. This determination can be made in a variety of ways, such as by querying the user or by using default or preference information. If it is determined that the number of matches should be further limited, the routine continues to step 540 to execute subroutine 540 to select a single stored state fragment. If it is instead determined in step 530 that the possible matches are not to be further limited, the routine instead continues to step 533 to prioritize and order the matching stored state fragments, and then selects the first of the matches in step 535. Those skilled in the art will appreciate that there are a variety of ways to prioritize and order the matching state fragments, such as based on the probability of match between the supplied recall tags and the stored recall tags, on user-supplied preferences, on user-supplied relevance ratings for the state fragments, on retention times for the state fragments, on a calculated degree of interest to the user, on order of storage, etc.

If it is instead determined in step 520 that a single matching stored state fragment is found, or after steps 535 or 540, the routine continues to step 545 to replay to the user on appropriate output devices state information from the selected state fragment that was previously collected from input devices. For example, if a stored state fragment includes audio information recorded from an input microphone and video information recorded from an input video camera, the audio information can be replayed on a speaker and the video information can be replayed on a visual display device. Similarly, textual input information can be displayed in textual form on a visual display device and/or converted to audio information to be presented to the user on a speaker. After step 545, the routine continues to step 550 to present stored annotation information for the selected state fragment to the user on appropriate output devices. After step 550, the routine continues to step 555 to optionally present other state information stored in the state fragment to the user, such as textual information from a user model or computer model. A determination of whether to present this other information can be made in a variety of ways, such as based on whether such information is available in the state fragment, on user preferences, or on explicit user indications. Those skilled in the art will appreciate that, while in the described embodiment information from a state fragment is presented to the user in a specific sequential order, in other embodiments state fragment information may be presented simultaneously or in a different order.

After step 555, the routine then continues to step 560 to determine if there are more matching stored state fragments that have not yet been presented to the user. If so, the routine continues to step 565 to select the next matching stored state fragment, and then returns to step 545. If it is instead determined in step 560 that there are no more matching stored state fragments, the routine continues to step 570 to determine whether to receive more indications from the user to retrieve stored state fragments. If so, the routine returns to step 505, and if not the routine ends at step 595.

FIG. 6 is an exemplary flow diagram of an embodiment of the Select Match Based On Additional Information subroutine 540. The subroutine receives indications of multiple state fragments, and uses user input to select one of the state fragments whose state information can then be presented to the user.

The subroutine begins at step 605 where the subroutine receives indications of multiple state fragments that match the previously supplied recall tags. The subroutine then continues to step 610 to determine what types of additional information should be used to further limit the group of possibly matching state fragments to a single state fragment. This determination can be made in a variety of ways, such as by querying the user or by using user preference, default information, or patterns of previous user choice. If it is determined that the annotations associated with the group of state fragments should be presented to the user, the subroutine continues to step 615 where the annotations for each state fragment in the current group are presented to the user on appropriate output devices. The subroutine then continues to step 620 to receive an indication from the user of at least one of the state fragments that has been selected based on the presented information.

If it was instead determined in step 610 to present other stored information from the state fragments to the user, the subroutine continues to step 625 to receive an indication (e.g., from the user) of a type of state fragment information to be presented, such as the time and date that the state fragment was created. The subroutine then continues to step 630 to present to the user on appropriate output devices the state information of the indicated type for each state fragment in the current group. At step 635, the subroutine then receives an indication of at least one of the state fragments that has been selected by the user based on the presented information. After steps 635 or 620, the subroutine continues to step 640 to remove from the group of current state fragments those state fragments which were not selected.

Alternately, if it was instead determined at step 610 to perform additional matching among the current group of state fragments, the subroutine continues to step 645 to receive an indication (e.g., from the user) of additional information to use in matching the current state fragments. For example, additional recall tags may be supplied, or alternately other types of state information (e.g., annotations or input device information) can be supplied. The subroutine then continues to step 650 to determine which of the current state fragments match the additional supplied information. In step 655, the subroutine determines whether there is at least one state fragment that matched the additional supplied information. If not, the subroutine returns to step 610, but if so, the subroutine continues to step 660 to remove from the group of current state fragments those state fragments which were not determined to match the additional supplied information. After steps 640 or 660, the subroutine continues to step 665 to determine if a single state fragment remains in the current group. If not, the subroutine returns to step 610, but if so, the subroutine continues to step 695 and returns.

Those skilled in the art will appreciate that, in addition to the described methods for allowing user determination of a single state fragment from the group of possible matches, a variety of alternate methods exist. For example, various automated methods of selecting a state fragment can be used, such as based on the state fragment in the group with the highest probability of matching the previously supplied recall tags. Alternately, the routine may be able to determine in an automated manner additional types of matching information to be used in selecting one of the group of state fragments.

In addition, those skilled in the art will appreciate that in addition to creating, storing, and recalling state fragments, the CAM system can perform a variety of other types of activities. For example, the CAM system can manipulate state fragments that have been created in a variety of ways. Some such manipulations are of an administrative nature, such as deleting state fragments that are no longer needed (e.g., that have exceeded their retention time limit). Other manipulations can include modifying state fragments that are to later be recalled, either based on indications from the user or based on system-generated indications. For example, such manipulations can include adding additional information to the state fragments (e.g., additional recall tags and annotations, or additional state information that is derived from other stored state fragment information). Conversely, other manipulations may modify or remove information stored in or associated with the state fragment.

As described above, in some embodiments the determination of when and how to store and recall state fragments is made based on user indications, while in other embodiments the determination is made automatically by the CAM system. When the determination is made automatically by the CAM system, some embodiments may monitor the user and the environment in order to gather information about the current state, and other embodiments may used information from a model of the user and the environment that is maintained by some other entity. FIG. 7 illustrates an embodiment of the body-mounted computer 220 that is executing a Condition-Dependent Output Supplier (CDOS) system 700 which maintains a model of the current condition of the user and the user's environment.

The computer 220 includes a memory 770, a CPU 780, and a storage device 790. The CDOS 700 system is executing in memory, as well as one or more distinct application programs 760. The computer is able to receive input from the flat panel display 230, microphone 124, other user input devices 222 and 252, user sensor input devices 226 and 256, environment sensor input devices 228 and 258, and video camera 121 (not shown). The computer is able to supply output to the flat panel display 230, earpiece speaker 232, tactile display 236, display 260, speaker 262, olfactory device 264, printer 266, telephone 268, and eyeglass mounted display 234.

As the body-mounted computer receives various input information, the information is forwarded to the User Characterization Module 705 of the CDOS system. The User Characterization Module monitors the user and the user's environment in order to create a current user model 710. After the User Characterization Module has created the user model, the Output Device Selector Module 715 and the one or more Format Modules 720–278 can then use the model information to determine when and how to present output information to the user.

In particular, the User Characterization Module can receive a variety of types of information, and can use this information to determine the user's current condition in a variety of ways. These types of information include explicit user input to the computer, sensed user information, and sensed environment information. The User Characterization Module can also receive date and time information from the CPU or from some other source, and can retrieve stored information (e.g., user preferences, definitions of various user-defined groups, or a default model of the user condition) from the storage device. It is also possible for one or more of the application programs to optionally supply application-supplied information 765 to the User Characterization Module. This information can include any type of user condition information to which the application program has access, such as user location or physiological state. In addition, the application programs can create new user condition variables, including those to be used only by that application program.

The various input information can provide current state information in a variety of ways. For example, user input information alone can provide significant information about the user's current condition. If the user is currently supplying input to the computer via a full-sized keyboard, for instance, it is likely that the user is engaged in little other physical activity (e.g., walking), that the user is devoting a significant amount of attention to the computer system, and that the user would see information flashed on the display. If the user is instead generating user input audibly (e.g., through a head-mounted microphone), that fact may provide less user condition information since the user can supply such audio information while engaged in a variety of types of physical activity. Those skilled in the art will appreciate that there are a wide variety of input devices with which a user can supply information to the computer system, including voice recognition devices, traditional qwerty keyboards, chording keyboards, half qwerty keyboards, dual forearm keyboards, chest mounted keyboards, handwriting recognition and digital ink devices, a mouse, a track pad, a digital stylus, a finger or glove device to capture user movement, pupil tracking devices, a gyropoint, a trackball, a voice grid device, video cameras (still and motion), etc.

In addition to the information received via user input, the User Characterization Module also uses sensed information about the user. For example, a variety of sensors can provide information about the current physiological state of the user, geographical and spatial information (e.g., location and altitude), and current user activities. Some devices, such as a microphone, can provide multiple types of information. For example, if a microphone is available, the microphone can provide sensed information related to the user (e.g., detecting that the user is talking, snoring, or typing) when not actively being used for user input. Other user-worn body sensors can provide a variety of types of information, including that from thermometers, sphygmometers, heart rate sensors, shiver response sensors, skin galvanometry sensors, eyelid blink sensors, pupil dilation detection sensors, EEG and EKG sensors, sensors to detect brow furrowing, blood sugar monitors, etc. In addition, sensors elsewhere in the near environment can provide information about the user, such as motion detector sensors (e.g., whether the user is present and is moving), badge readers, video cameras (including low light, infra-red, and x-ray), remote microphones, etc. These sensors can be both passive (i.e., detecting information generated external to the sensor, such as a heart beat) or active (i.e., generating a signal to obtain information, such as sonar or x-rays).

Stored background information about the user can also be supplied to the User Characterization Module. Such information typically includes information about the user that changes at most infrequently, although it is possible to frequently update the stored background information to reflect changing conditions. For example, background information about the user can include demographic information (e.g., race, gender, age, religion, birthday, etc.) if it can affect when and how information should be stored, recalled, or output. User preferences, either explicitly supplied or learned by the system, can also be stored as background information. Information about the user's physical or mental condition which affects the type of information which the user can perceive and remember, such as blindness, deafness, paralysis, or mental incapacitation, is also important background information that allows systems with access to this information to adapt to the user's capabilities.

In addition to information related directly to the user, the User Characterization Module also receives and uses information related to the environment surrounding the user. For example, devices such as microphones or motion sensors may be able to detect whether there are other people near the user and whether the user is interacting with those people. Sensors can also detect environmental conditions which may affect the user, such as air thermometers or Geiger counters. Sensors, either body-mounted or remote, can also provide information related to a wide variety of user and environment factors including location, orientation, speed, direction, distance, and proximity to other locations (e.g., GPS and differential GPS devices, orientation tracking devices, gyroscopes, altimeters, accelerometers, anemometers, pedometers, compasses, laser or optical range finders, depth gauges, sonar, etc.). Identity and informational sensors (e.g., bar code readers, biometric scanners, laser scanners, OCR, badge readers, etc.) and remote sensors (e.g., home or car alarm systems, remote camera, national weather service web page, a baby monitor, traffic sensors, etc.) can also provide relevant environment information.

In addition to receiving information directly from low-level sensors, the User Characterization Module can also receive information from devices which aggregate low-level information into higher-level data constructs (e.g., face recognizers, gesture recognition systems, affective/emotion recognizers, etc.). The user can also explicitly supply information about their current condition (e.g., "I have a high cognitive load and do not want to be disturbed" or "I am distracted and will need greater assistance than normal in recalling current state information"). The User Characterization Module can also receive current date and time information in order to both track changes over time and to utilize information such as the user's stored schedule. Previously-created models of the user's condition can also be retrieved and used as a default or to detect changing conditions. Information from the computer indicating the types of output currently being presented to the user can provide information about the user's current activities and cognitive load.

In some embodiments, multiple CAM or CDOS systems communicate between themselves, such as via a wireless medium or when cabled together. This intercommunication can occur automatically, or at the instruction of one or more of the users of the communicating systems. When multiple systems communicate, a variety of types of information can be passed between the systems. For example, a first CDOS system receiving information from other CDOS systems can use those other systems as a type of remote sensor in which information received by the User Characterization Modules of the other systems is also supplied as input to the User Characterization Module of the first system. Other systems may also have access to information about the surrounding environment (e.g., a still video camera) that a system does not have. Alternately, information about the users of the systems can be exchanged and included in a state fragment about an encounter between the users, or to facilitate further communication between the systems or between the users (e.g., notifying one user that another user has a high cognitive load and does not wish to be disturbed). Multiple systems can also act as cooperative systems in which one or more users' systems are shared with other users (e.g, making available excess computing power or the use of an output device).

After the User Characterization Module receives one or more of these types of information, it processes the information and creates a current model of the user condition which will include multiple user condition variables (with current values for some or all of the variables). Once the model of the user condition has been created and then later updated, older versions of the model will be made available to the User Characterization Module to assist in the characterization of the user, such as with changes over time. The model will also be available to the Output Device Selector Module to assist with presentation of output information. Moreover, the model of the user condition can additionally be stored in a permanent manner, such as on the storage device, if non-current versions of the user condition model are useful. Similarly, the User Characterization Module, Output Device Selector Module, and any Format Modules can be permanently stored before being executed in memory, and any changes made to the modules while they are executing can also be saved.

The model of the current user condition can represent a variety of types of information. In one embodiment, the User Characterization Module merely stores the data it receives (even when it is at a low-level of abstraction) and then allows other modules to directly use that stored information when making decisions related to the current state. In an alternate embodiment, the User Characterization Module uses received low-level data to generate higher-level representations of the user's observable activities (e.g., walking, watching a movie in a movie theater, talking to co-workers at the office, etc.).

In yet another embodiment, the User Characterization Module further characterizes the user's condition with respect to condition variables that are not directly observable. Such condition variables include the current cognitive load of the user (indicating amount of attention required for the user's current activities and thus the ability of the user to devote attention to the computer), the current degree of interruptibility for the user (indicating ability to safely interrupt the user), the current degree of intrusiveness of output on the environment (indicating impact of output on the surrounding environment), the user's desired scope of audience for information being output (indicating how many people should be able to perceive the information), the user's desired level of privacy for information being output (indicating the group of people who are allowed to perceive the information), and the user's desired level of solitude (indicating the user's current desire to avoid intrusions).

User condition variables can also represent abstract principles about the user and the surrounding environment, such as the user's relationship to other objects, people, or locations (e.g., being at their desk, being in their office, being near the drug store, talking to a particular person, etc.). In some embodiments, CDOS systems can supply information about user condition variables and their values to other CDOS systems, and those other CDOS systems can add the user condition variables and/or values to their model of their user condition if appropriate (e.g. ambient air temperature, or an emotional state of a CDOS system's user that is sensed by another CDOS system).

The CAM system can use information from the user model to determine how and when to store current state information. For example, a high-level condition variable can be created that directly indicates whether the user would like current state information to be stored in a state fragment. Alternately, the determination of whether to create a state fragment can be made based on one or more other high-level condition variables. For example, if the user's mood is determined to be very happy, the CAM system may determine to store a state fragment since the user may wish to remember the environmental factors which may be contributing to the happy state. Alternately, if the ambient noise in the surrounding environment is high or the user's cognitive load is high, an increased amount of state information can be stored in state fragments since the user may be less likely to perceive and remember information. In addition, if sufficient storage space is available, all available input information can be stored in successive state fragments (e.g., each state fragment representing 5 minutes of time) which are retained for a limited period of time (e.g., a day) so that the user can later recall any part of the day which they may not remember.

In a similar manner, the values for the user condition variables can also directly impact how and when previously stored state information should be presented to the user. Thus, a high-level condition variable can be created that directly indicates that the user would benefit from receiving previously stored state information from a state fragment, or that the user would like to receive such state information for a particular category or recall tag. Alternately, the determination of whether and how to recall a stored state fragment can be made based on one or more other high-level condition variables. For example, when the user's cognitive load is high or the degree of interruptibility is low, an indication that stored state fragment information is available may be presented in a manner that is minimally intrusive to the user (e.g., on a tactile display using light pressure). Alternately, the presentation of the information may be deferred if no appropriate output device is available or if interrupting the user is not warranted by low-importance or low-urgency information. When the stored state fragment information is sensitive and others present are not included in the current desired level of privacy, the information may be presented on an eyeglass-mounted display, or the information may be presented via an earpiece speaker when the scope of audience or intrusiveness on the surrounding environment dictates that others not perceive the presented information. Finally, if the user's desired level of solitude indicates that the user does not want to receive output information (e.g., while asleep, in the bathroom, involved in an intimate activity, etc.), presentation of all output information or of all but highly urgent and important output information may be deferred.

Those skilled in the art will appreciate that the User Characterization Module may receive contradictory information related to one or more aspects of the user condition. For example, a motion sensor device may indicate that no one else is present in a room, while a speech recognizer may report that another person is present. Mediation of such contradictory data can be handled in a variety of ways. For example, it may be possible to reconcile such data (e.g., the user is communicating with another person via a telephone with a loudspeaker). Alternately, the data can reflect different readings for changing conditions (e.g., ambient air temperature may have changed quickly after a window was opened). When data truly conflicts, it may be impossible to reach a conclusion about a user condition variable, or the value of the variable may be represented as having varying degrees of uncertainty or belief. Both particular information sources (e.g., sensors) and particular pieces of input information can be categorized as to their quality and reliability to assist with mediation or to better model the user condition. In addition, input information can be time-stamped and otherwise identified to assist the User Characterization Module.

Those skilled in the art will also appreciate that a variety of factors can influence the determination of values for each of the condition variables, and that the values for the variables can be stored in a variety of ways (e.g., a number on a scale of 1–100 or 0–255, a probability distribution, a value from a delimited set of possibilities, a fuzzy logic value, etc.). Factors which can affect the cognitive load of a user include if the user is talking (and the volume of the speech), is talking on the phone, physical movement such as walking or driving, being stationary, being seated and stationary, ambient light and sound, stress and hunger levels, a level of rest (e.g., a low level due to a recent lack of sleep), activity such as reading e-mail or riding a bull, historical data (e.g., user has low threshold for cognitive load while watching baseball games), a physical or mental disability, location (e.g., at home or therapist's office), presence and frequency of user input such as keyboard or mouse activity, presentation of output information to the user, emotional state, explicit indications from user, etc. Similarly, factors that can affect desired level of privacy and desired scope of audience include the identity of others near the user, the proximity of others to the user, explicit tagging of activities or information (e.g., email in my personal account is private for only me, while email in my family account is private for family members), nature of work being performed (e.g., balancing a checkbook, playing a computer game, or revising a business spreadsheet), location, historical data, explicit indications from user, etc.

In addition, values for some user condition variables may be calculated only periodically or only upon specific request for the value (e.g., computationally intensive variable values such as those generated by a face recognizer), even if the appropriate input information is supplied more frequently. Conversely, some embodiments of the CDOS system may allow the User Characterization Module to request or retrieve the appropriate input information needed to calculate one or more user condition variables, thus performing demand-driven processing. An illustrative example of a User Characterization Module is described in greater detail with respect to FIG. 9.

In some embodiments, CDOS systems can supply to other CDOS systems various information related to generating the model of the user condition, and those other CDOS systems can use that model generation information in addition to or in place of their own model generation information. For example, if rules are being used to generate the model of the user condition, one CDOS system can supply some or all of its rules to other CDOS systems. Similarly, default and/or specialized sets of model generation information can be supplied to a CDOS system, either from other CDOS systems or by loading that information onto the CDOS system. A default set of rules may be used by a CDOS system until learning by the system adds or modifies the default rules to better model the user of the system. Similarly, other programs (e.g., application programs) can supply rules to the CDOS system, such as rules specific to that application program. Various specialized sets of rules can also be supplied. For example, sets of rules may be specialized based on occupation (e.g., a nurse, a secretary, a field technician, or a firefighter), gender (e.g., a woman's rules may understand physiological symptoms related to pregnancy or other female-specific conditions), age, or any of a variety of other specialization types.

After the User Characterization Module has created a model of the user's current condition, the Output Device Selector Module and the one or more Format Modules can then use the model to determine when and how to present output information to the user. Thus, when the Output Device Selector Module receives output information to be presented, such as from one of the application programs or from a CAM system, it uses the current model of the user condition as well as information about the available output devices to determine an appropriate output device on which to present the information to the user. In some embodiments, the Output Device Selector Module may retrieve information about the output device characteristics upon initialization, such as from the storage device. Alternately, the Output Device Selector Module can instead receive the information directly from the output devices as they are dynamically configured. The source of the output information can also supply a description of the information to assist in selecting where, when and how to present the information to the user. After an output device has been selected, the Output Device Selector Module forwards the output information as well as appropriate output information description factors and user condition variables to the Format Module for the output device. In the illustrated embodiment, Format Modules 720 through 728 correspond to the output devices as shown.

The Output Device Selector Module can select an appropriate output device for presenting information to the user in a variety of ways. For example, if the model of the user condition indicates that auditory output is currently preferable to other forms of output and the output information can be presented audibly, then the Output Device Selector Module selects an output device that supports audible output. Alternately, the value of a desired level of privacy, desired scope of audience, or current cognitive load user condition variable may indicate that audible output is currently preferable.

In one embodiment, the Output Device Selector Module selects output devices by first characterizing each of the output devices relative to selected condition variables, such as cognitive load, desired level of privacy, desired scope of audience, and intrusiveness on the environment. For example, an eyeglass-mounted display may have a high rating for ability to present sensitive information to only the user, but may have a low rating for lack of intrusiveness on the user (particularly if the user has a high cognitive load from another visual activity). Similarly, an olfactory device which can output various smells may be low on the intrusiveness scale, but may be useful for presenting only limited types of output (e.g., a soothing aroma when the user has high blood pressure and a high pulse). Output devices can also be characterized on the basis of the user sense (e.g., olfactory or visual) to which the output information will be presented.

After the output devices have been characterized on the basis of the condition variables, the Output Device Selector Module then selects the one or more output device which are most appropriate for the user's current condition and for the information to be output. In some situations, a characterization of a device relative to a condition variable is dependent on the circumstances rather than being inherent in the capabilities of a device. For example, a stereo or a television may have a high degree of privacy while only the user is in the room, but the characterization for these devices may change to a low degree of privacy when others enter the room. In some embodiments, such devices are represented with a characterization that is a range of values, with only a single value or a subset of the range selected at a given time based on the current circumstances.

In addition to supplying the output information to be presented, an external entity can also supply information that describes the output information, such as the relative importance and urgency (i.e., the degree of deferability, such as time sensitivity) of the information, as well as the consequences of ignoring the information. In the same manner that the output devices can be characterized relative to condition variables, they can also be characterized relative to such factors in the description information. For example, an eyeglass-mounted display and an earpiece speaker with adjustable volume may both be highly-rated with respect to their ability to present important information that has a high consequence of being ignored. The earpiece speaker may have a wide range of ratings for these factors, however, since it is also able to present low importance information (e.g., at a low audio volume which can be easily ignored by the user if the user so chooses). Conversely, the eyeglass-mounted display may not be able to unobtrusively present visual information, and thus may have a small range of ratings for this factor. Thus, after the Output Device Selector Module receives the information to be output and optionally receives a description of the information, the Output Device Selector Module then uses the model of the user condition to determine which output device (if any) to use to present the information to the user, and a corresponding Format Module for that device determines the appropriate format with which to present the information to the user.

In one embodiment, the Output Device Selector Module includes a characterization of each output device available to the CDOS system relative to the user condition variables of cognitive load, desired level of privacy, desired scope of audience, and desired level of intrusiveness on others, as well as to output information description factors of relative level of importance, deferability, and consequence of ignoring. The one or more devices which best match the current user condition and the current output information will be selected, including using user preferences to select between different devices. Those skilled in the art will appreciate that the Output Device Selector Module can determine an appropriate output device in a variety of other ways, including receiving a direct specification from the entity supplying the output information, selecting the device with the widest range of capabilities relative to the type of information to be output, etc. In addition, a defined API (application program interface) can be designed between external entities such as application programs and the CDOS system. The defined API will allow application programs to supply information to User Characterization Modules, extract and add information to the model of the user condition, and supply output information and description information to Output Device Selector Modules. An illustrative example of an Output Device Selector Module is described in greater detail with respect to FIG. 10.

After the Output Device Selector Module supplies output information to a Format Module, the Format Module formats the output information for presentation, with the formatting based in part on the information presentation capabilities of the output device. For example, the output device may be able to output information to more than one user sense, in more than one way, and with varying degrees of amplitude or style (e.g., flashing text or enlarged icons). The Format Module selects an appropriate method of formatting the information, such as to present the information to only the appropriate audience or with the appropriate level of intrusiveness, and then sends the information to its corresponding output device for display. The Output Device Selector Module will also inform the User Characterization Module when output is to take place so that the model of the user condition can be updated accordingly.

While information to be presented to the user will often be generated by an entity outside the CDOS system, the CDOS system may also generate information to be presented to the user (e.g., an indication of low battery power, or of an error when adding a rule to the User Characterization Module). In addition, in some embodiments external entities, such as an application program or the CAM system, can directly access the model of the user condition and make their own determination as to when, where and how to present output information (i.e., bypassing the Output Device Selector Module and/or the Format Modules). Thus, if the modeled user condition indicates that particular output information should not currently be presented to a user, the external entity can postpone or cancel the presentation of the output information without ever supplying the output information to the CDOS system. It may also be possible to configure the CDOS system to automatically notify the external entities of the values of one or more user condition variables, such as by pushing that information to the external entities when changes occur in the values or by periodically notifying the external entities of the current values.

Those skilled in the art will appreciate that the Format Modules may communicate with their corresponding output devices in a variety of ways, and that the body-mounted computer in the CDOS system may contain additional components or may lack some illustrated components. For example, there may not be a one-to-one mapping between Format Modules and output devices, functionality performed by the Output Device Selector Module and Format Modules may be incorporated together, and the creation of the model of the user condition may be performed by a different system than that which uses the information to present output information. There may also be multiple User Characterization or Output Device Selector Modules, such as one User Characterization Module for each relevant high-level condition variable. Alternately, external entities such as the application programs can add their own User Characterization, Output Device Selector or Format Modules, or can directly access the model of the user condition in order to perform presentation of output information. Accordingly, the present invention may be practiced with other computer system configurations.

In addition, those skilled in the art will appreciate that CAM and CDOS systems can be simultaneously executing, either on the same computer or on different computers, and can communicate in a variety of ways. In some embodiments, the CAM system may merely use the user model created by the CDOS system, while in other embodiments the systems may exchange a variety of types of information. For example, the CAM system can forward state information from a stored state fragment to the Output Device Selector Module and allow that module to determine how best to present the information to the user. In other embodiments, the CDOS system or User Characterization Module may be a module of the CAM system (e.g., the User Modeling Module), while in other embodiments the systems may be separate.

FIG. 8 is an illustrative example of a Model of User Condition 710. As is shown, the model reflects the condition of user X at time 14:22 hours on the displayed date. The illustrative model of the user condition includes a variety of user condition variables at different levels of abstraction, including low-level information directly from user sensors as well as higher-level abstract variables with characterized values that reflect a user's current physical and mental states. Historical and time-sensitive information can also be included, as shown by the variable illustrating the last user input performed by user X.

Intermediate-level variables included in the model can be calculated from low-level input information such as sensor values. For example, the speed of the user can be calculated directly by a sensor such as a pedometer, or can be calculated indirectly via information over time from a GPS sensor. In addition, the Speed variable indicates that additional information can be included in the user model for each variable. In the case of the Speed variable, uncertainty about the exact value of the variable is demonstrated. Other calculated condition variables include an indication that the user is located in their office, is near their desk, and that there are no other people physically nearby. These factors can be determined in a variety of ways, such as via a motion sensor device located on the desk that is tracking the user and the absence of other individuals, or by the lack of any sounds from any other people via one or more microphones.

Higher-level condition variables can also be calculated, such as the user's current physical activities, the current user cognitive load, the desired level of privacy, and the desired scope of audience. Information from the microphone or directly from the cellular phone can indicate that the user is currently talking on their cellular phone, and the speed and motion sensor data can indicate that the user is walking. Since the user remains near his desk even though he is walking, the system can deduce that the user is pacing about his office or is walking on a treadmill (not shown). The User Activity variable demonstrates that variables can have multiple values, and that information such as a degree of belief or certainty in the value for a variable can be added and used by the system.

The Cognitive Load variable indicates a score of 77 out of 100, thus indicating a relatively high cognitive load due to the combination of the user walking and talking on the phone. Since it is unlikely that information presented by the system will be desired to be perceptible by the person on the other end of the phone, the desired Scope Of Audience variable indicates that only the user is currently appropriate to receive output information. Since the User Characterization Module was able to identify the other person on the phone as Doug Smith, an executive level colleague at user X's company (e.g., by voice recognition or the use of that person's name), the desired Level Of Privacy variable indicates that if information is presented in a manner such that the other person can receive it (e.g., through an external speaker), general information about the company as well as executive-level sensitive information can be presented. Note that although low-level sensors such as a motion detector may have indicated that there are no other people physically nearby, when it was determined that the user was talking on a phone, additional information was added to the Nearby People variable to indicate that someone is within audio perception of the user.

The remaining displayed portions of the user condition model indicate that user preference information and externally supplied information can be included in the user condition model. For example, the Application X-Factor 1 variable has been supplied by application X, as well as a value for the variable. In this case, the value is a normal probability distribution with a mean of 23 and a standard deviation of 3. In addition, previously supplied user preference information can indicate which output devices and which output formats are preferred by the user. Alternately, the system can have automatically learned these preferences over time by observing user reactions to various outputs, as well as from explicit suggestions and overrides by the user. Those skilled in the art will appreciate that the illustrated user condition model is merely illustrative and is not intended to limit the scope of the present invention. The model may contain additional variables or may lack some illustrated variables, or may be represented without explicit condition variables at all.

FIG. 9 is an illustrative example of User Characterization Module 705. As is shown, the illustrated User Characterization Module is for user X and it includes a variety of IF-THEN rules. User condition variables are shown with angle brackets surrounding them, with some user condition variables (e.g., Speakerphone.Status) not shown in the illustrative model of user condition 710 in FIG. 8. In addition to the IF-THEN rules, WHILE-THEN rules are also shown, as well as an application-specific rule (i.e., the APPX: rule) added by an external application. The illustrative User Characterization Module also indicates that the results portion of the rules (shown after the THEN statements) can set or modify the values of condition variables, such as by absolute or percentage numerical amounts, and can indicate degrees of belief or uncertainty in values. Groups of people are shown in square brackets (e.g., Company Executives), and asterisks are wild-card characters that can match any information.

As mentioned previously, receiving input related to one user condition variable can cause multiple changes to propagate through the set of rules. For example, if input is received that indicates that the user condition variable Desktop.Motion.Sensor.Human.Movement is true and the User Activity variable value indicates that user is seated, one of the rules shown indicates that the Nearby People variable will be modified (if necessary) to indicate that an "Unidentified Person" is physically nearby. Modifying the Nearby People variable can then affect the Level Of Privacy or Scope Of Audience user condition variables as shown by other rules. Those skilled in the art will appreciate that the illustrated User Characterization Module is merely illustrative and is not intended to limit the scope of the present invention. The model may contain additional rules, may lack some illustrated rules, or may be implemented without using rules at all. In addition, the test and/or results portions of rules can be implemented as invokable functions, including those provided by external entities such as application programs. Those skilled in the art will appreciate that the State Storage Rules 356 and State Recall Rules 358 discussed in FIG. 3 can use a format similar to that of the rules illustrated for the User Characterization Module.

FIG. 10 is an illustrative example of Output Device Selector Module 715. As is shown, the module is for user X and it maps each available output device to ratings for selected user condition variables and output information description factors. As is shown, some output devices which are available at times (e.g., pager 1002, cellular telephone 1004, and car radio 1006) are not currently available. In addition, earpiece speaker 232 may not currently be able to receive output information if it is already in use (e.g., the user is listening to music). Alternately, new output information can preempt the current use of the earpiece speaker if necessary, or can instead share the use of the output device (e.g., outputting music to one ear and other information to the other ear if the earpiece speaker is part of headphones).

As is shown, the various output devices are rated with single values or a range of values for each factor. While textual values are used, those skilled in the art will appreciate that numerical or other types of rating systems can be used. In the illustrated embodiment, ranges may illustrate the device capabilities in different situations, with the ranges being restricted in any particular situation. For example, the earpiece speaker can accommodate when the user has a very low cognitive load by adjusting the volume to be slightly louder than the ambient environment. Alternately, even if the user has a high cognitive load, the earpiece speaker can interrupt the user if necessary for urgent information by using very loud volumes or distinctive tones. In addition, the ratings can be adjusted to reflect the specific situation of this user. For example, since the speaker 262 is located on the user's desk at work and other employees can frequently or always hear the speaker, the value for the desired Level Of Privacy may indicate that only business information be presented via the speaker. Alternately, the system can present information by sending it to the cellular telephone if the information is highly sensitive or it is important to interrupt the user. However, if others are present around the user, frequent use of the cellular telephone can be highly intrusive to them (particularly in environments such as a lecture or a movie).

Those skilled in the art will appreciate that the illustrated Output Device Selector Module is merely illustrative and is not intended to limit the scope of the present invention. The module may contain additional user condition variables and output information description factors, may lack some illustrated user condition variables and output information description factors, or may select output devices on which to present output information in an entirely different manner. For example, the output devices can be rated on the basis of their ability to output different types of stored state information, or on the basis of their ability to output state information for stored state fragments of different categories or degree of interest to the user. In addition, some embodiments of the Output Device Selector Module may include specific logic, such as IF-THEN rules, to be used in conjunction with the mapping of output devices as shown.

Figure 11:
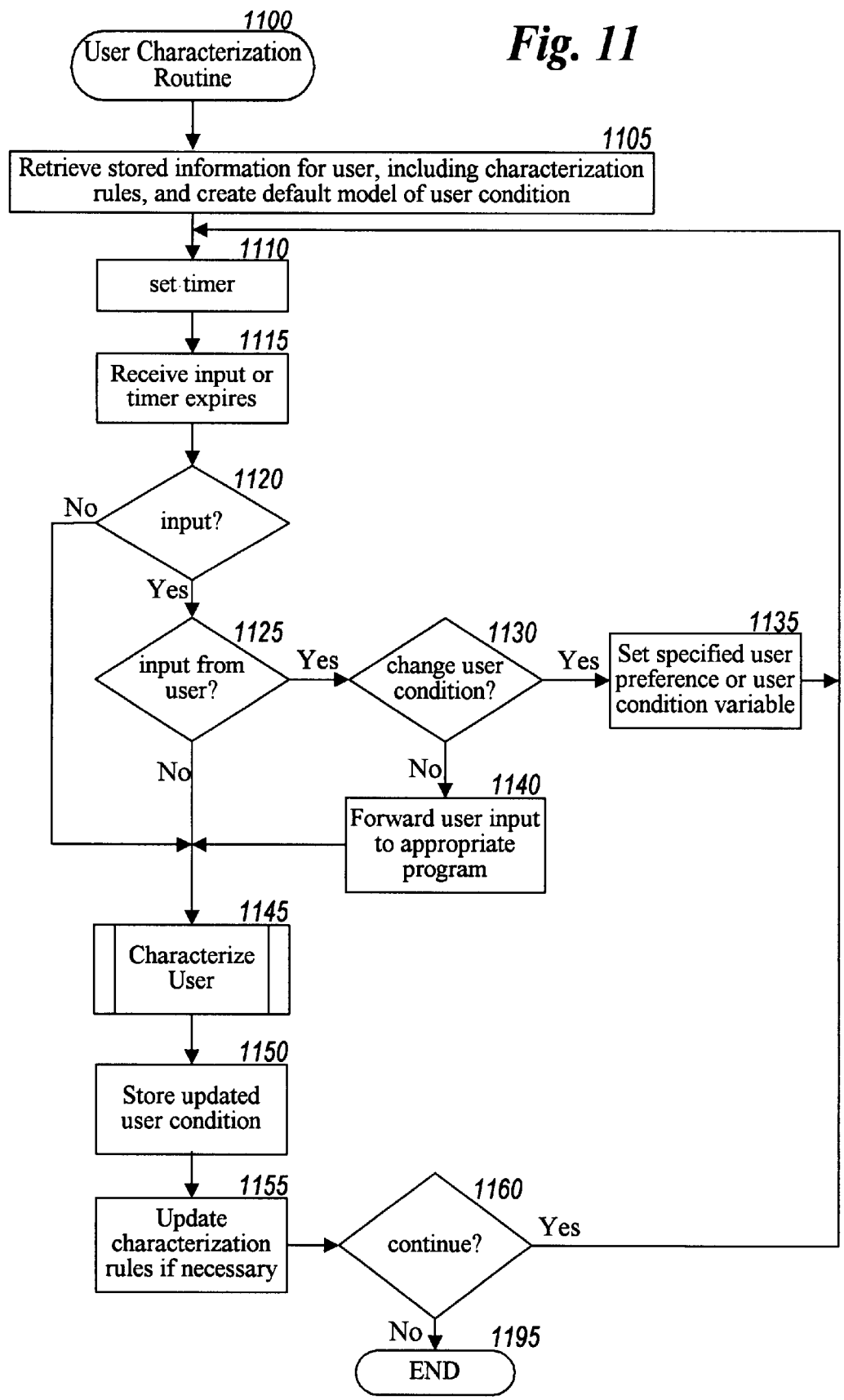
FIG. 11 is an exemplary flow diagram of an embodiment of the User Characterization routine.

FIG. 11 is an exemplary flow diagram of an embodiment of the User Characterization Routine 1100. The User Characterization Routine retrieves stored information related to the user, including a default model of the user condition, receives various types of input information related to the user or the user's environment, updates the model of the user condition to reflect the new information, and periodically updates the model if no information has been received within a prescribed time. The routine begins at step 1105 where stored information for the user is retrieved, including a set of characterization rules to be used by the routine. The routine then creates a default model of the user condition, such as directly from stored information or by applying the characterization rules to default user information that is available. The routine then continues to step 1110 to set a timer, and continues to step 1115 to either receive input information or to receive a notification that the timer has expired.

The routine continues to step 1120 to determine if input information was received. If so, the routine continues to step 1125 to determine if the information received was information input to the computer by the user. If so, the routine continues to step 1130 to determine if the user input indicates that the user condition should be modified, such as by setting a user preference or explicitly changing the value of a user condition variable. If so, the routine continues to step 1135 to satisfy the user request, and then returns to step 1110. If it was instead determined in step 1130 that the user input was not directed to the User Characterization Module, the routine continues to step 1140 to forward the user input information to the appropriate destination (e.g., an application program).

After step 1140, or if it was determined in step 1120 that the timer had expired or in step 1125 that the information received was not user input, the routine continues to step 1145 to execute the Characterize User Subroutine to update the model of the current user condition. After step 1145, the routine continues to step 1150 to store the updated user condition model, and then continues to step 1155 to update the characterization rules if necessary. The characterization rules can be updated in a variety of situations, such as if an external entity (e.g., an application) explicitly adds a new characterization rule or if the routine monitors the user's behavior and reactions in an attempt to learn more appropriate characterization rules. After step 1155, the routine continues to step 1160 to determine if there is more information to receive. If so, the routine returns to step 1110, and if not, the routine ends at step 1195.

Figure 12:
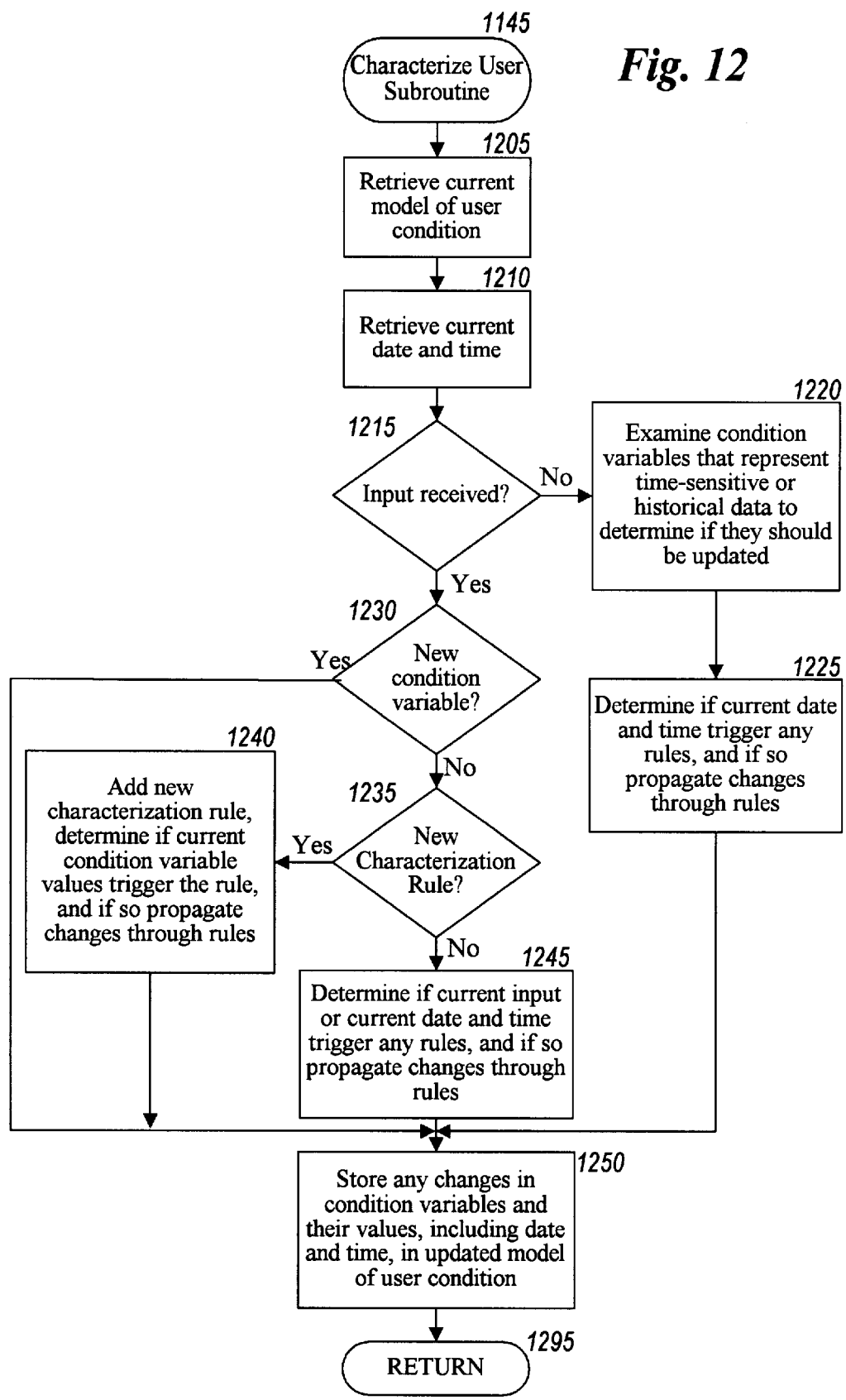
FIG. 12 is an exemplary flow diagram of an embodiment of the Characterize User subroutine.

FIG. 12 is an exemplary flow diagram of an embodiment of the Characterize User Subroutine 1145. The subroutine is executed when information is received related to the user or the user's environment, or when a timer has expired indicating that no information has been received for a specified period of time. When no information has been received for a period of time, the model of the user's current condition may need to be updated so that time-sensitive information can be updated in the model of the user condition. The subroutine begins at step 1205 where the current model of the user condition is retrieved. The subroutine then continues to step 1210 to retrieve the current date and time. In step 1215, the subroutine determines whether information was received or if the timer has expired. If the timer has expired, the subroutine continues to step 1220 to examiner user condition variables that represent time-sensitive information or historical data and updates them if necessary. The subroutine then continues to step 1225 to determine if the current date and time trigger any characterization rules, and if so, the changes from these triggered rules are propagated through the set of rules.

If it was instead determined in step 1215 that information to be processed was received, the subroutine continues to step 1230 to determine if a new user condition variable has been defined, such as by an application program, and if so continues to step 1250. If a new user condition variable has not been defined, however, the subroutine continues to step

1235 to determine if a new user characterization rule is being added, such as by an application program. If so, the subroutine continues to step 1240 to add the new characterization rule, determine if current values for any user condition variables trigger the rule, and if so propagates any changes from the triggered rules through the set of rules. If it was instead determined in step 1235 that a new characterization rule is not being defined, the subroutine continues to step 1245 to determine if the current input information or the current date and time trigger any rules, and if so, changes from those triggered rules are propagated throughout the set of rules. In addition to information received directly from the user, sensors, or application programs, this input information can also be a notification from the Output Device Selector that indicates output information is currently being presented to the user.

After steps 1225, 1230, 1240, or 1245, the subroutine continues to step 1250 to store any changes in user condition variables and their values, as well as the new date and time, in an updated model of the user condition. The subroutine then continues to step 1295 and returns. Those skilled in the art will appreciate that a variety of types of information related to the user and the user's environment can be received, and that the User Characterization Routine and the Characterize User Subroutine can process this information in a variety of ways, including other than with sets of IF-THEN rules.

Figure 13:
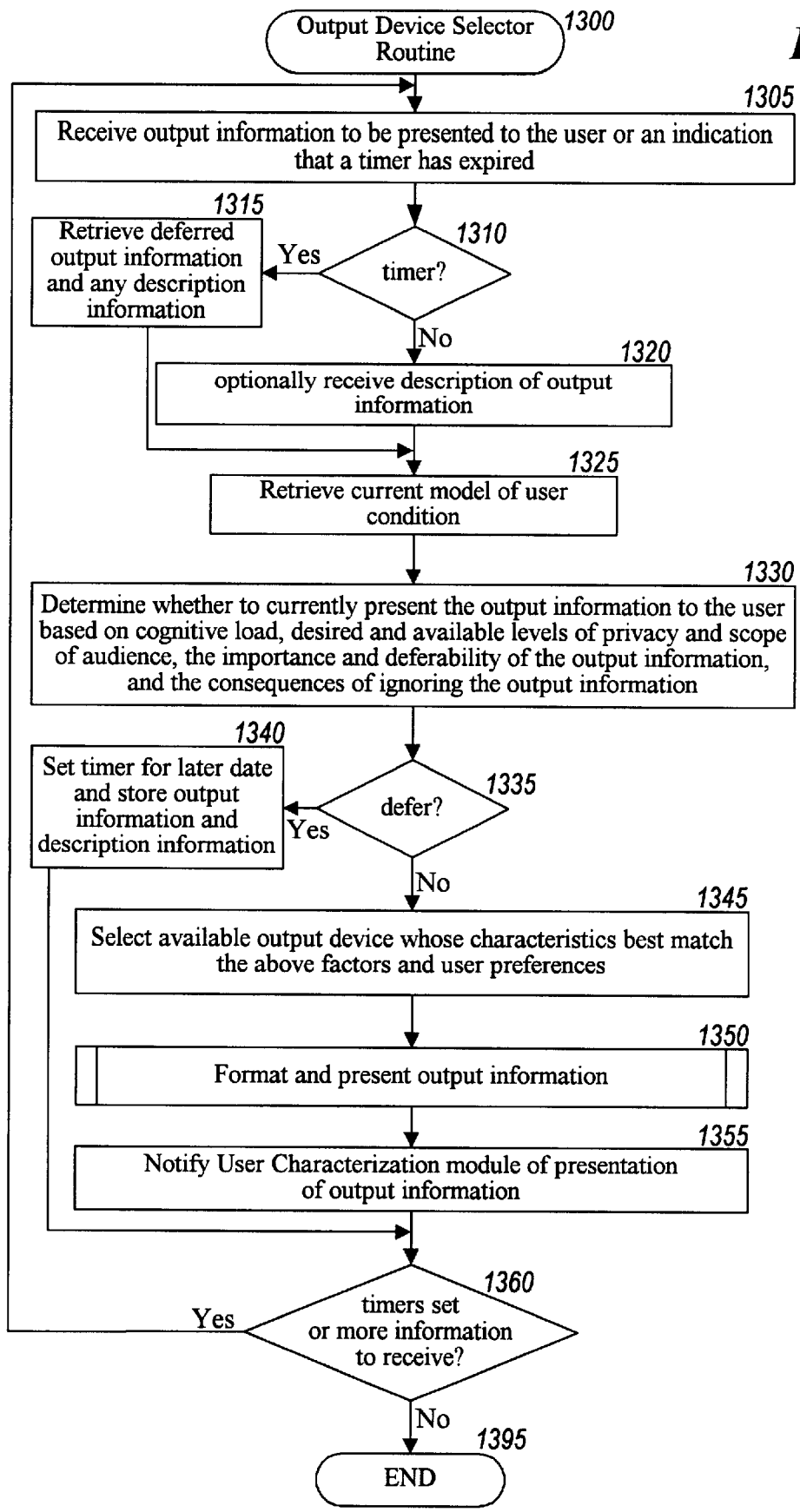
FIG. 13 is an exemplary flow diagram of an embodiment of the Output Device Selector routine.

FIG. 13 is an exemplary flow diagram of an embodiment of the Output Device Selector Routine 1300. The Output Device Selector Routine receives output information to be presented to the user, retrieves current characterized information about the user from the model of the user condition, determines whether the output information should be presented to the user at this time and if so on which output device and in what format, and then notifies the User Characterization Module when output information is presented to the user. The routine begins at step 1305 where output information to be presented to the user is received or an indication that a timer has expired occurs. The routine continues to step 1310 to determine if a timer has expired. When output information cannot be currently presented to the user (e.g, no satisfactory output device is available or presentation to the user can be dangerous or inappropriate), the presentation is deferred and a timer is set to indicate when to review presenting the information. Thus, if it is determined in step 1310 that a timer has expired, the routine continues to step 1315 to retrieve the deferred output information for the timer, as well as any description information for the deferred output information. If it is instead determined in step 1310 that new output information to be presented has been received, the routine continues to step 1320 where description information for the output information is optionally received.

After steps 1315 or 1320, the routine continues to step 1325 to retrieve relevant information from the current model of the user condition. The routine then continues to step 1330 to determine whether to currently present the output information to the user. In the illustrated embodiment, this determination is made using the user condition variables of cognitive load, desired level of privacy, and desired scope of audience. In addition, available description information which indicates the importance and the deferability of the output information and the consequences of the user ignoring or not receiving the output information are considered, as is any user preference information. Current values for these user condition variables and description factors, as well as whether available output devices can support the necessary formatting of information (e.g., presenting information to the appropriate scope of audience or at the appropriate level of intrusiveness for the user's cognitive load), are thus used in the determination. Those skilled in the art will appreciate that other factors can be used for this determination or that the determination can be made in other ways.

The routine then continues to step 1335 to determine whether the presentation of the information is to be deferred or not. If the presentation is to be deferred, the routine continues to step 1340 to store the output information as well as its description information, and to set a timer for the information at which time the presentation of the output information will be reconsidered. If it is instead determined in step 1335 that the information presentation is not to be deferred, the routine continues to step 1345 where an available output device is selected. In the illustrated embodiment, the output device whose information display capabilities and ratings best match the user condition variables and description information factors of interest is chosen. The routine then continues to step 1350 to execute the Format And Present Output Information Subroutine, and then continues to step 1355 to notify the User Characterization Module of the presentation of the output information. After step 1340 or step 1355, the routine continues to step 1360 to determine if there are currently timers set or there is more output information to be received. If so, the routine returns to step 1305, and if not the routine ends at step 1395.

Figure 14:
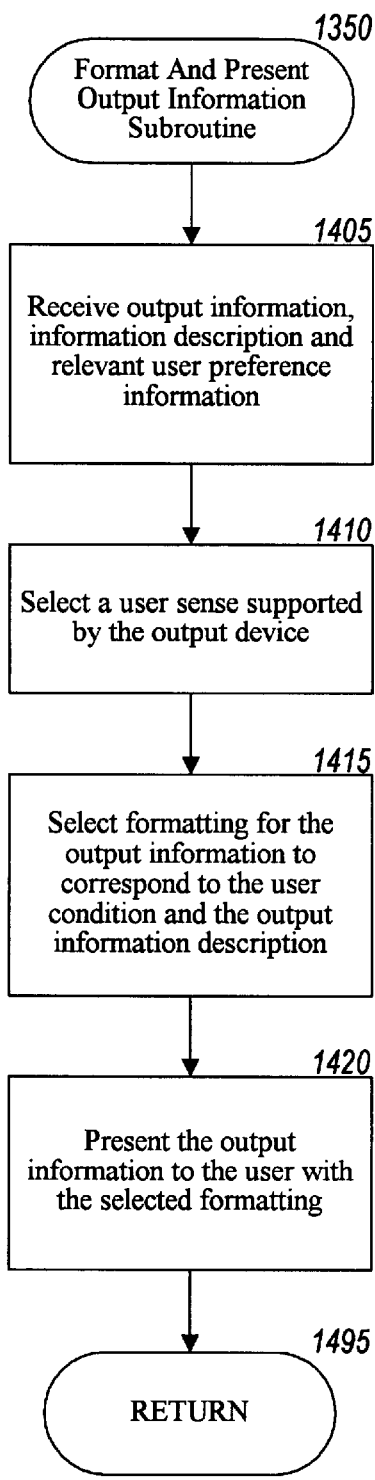
FIG. 14 is an exemplary flow diagram of an embodiment of the Format And Present Output Information subroutine.

FIG. 14 is an exemplary flow diagram of an embodiment of the Format And Present Output Information Subroutine 850. The subroutine receives output information to be presented and its description information, receives relevant user condition variables and user preference information, selects a user sense to which the output information will be presented (if the output device supports more than one), selects appropriate formatting with which to present the output information, and presents the output information to the user. The subroutine begins at step 1405 where output information is received, as well as the description information factors, user condition variables, and relevant user preference information. The subroutine continues at step 1410 to select a user sense that is supported by the selected output device.

In step 1415, the subroutine selects formatting for the output information that is appropriate for the user condition variables, output information description, and user preferences. Those skilled in the art will appreciate the formatting of the output information will vary with each user sense (e.g., adjusting volume for the audio sense and adjusting pressure for the tactile sense), as well as with the specific output device. After the formatting for the output information is selected, the subroutine continues to step 1420 to present the output information to the user with the selected formatting. If the Scope Of Audience and Level of Privacy user condition variables indicate that the information can be presented to other people currently present and the selected output device supports such presentation, the information will also be presented to these other people. After step 1420, the subroutine continues to step 1495 and returns.

Those skilled in the art will appreciate that the selection of an output device and the formatting of the output information for that device can be performed in a variety of ways. For example, other user condition variables and description information factors can be used, or the selection can be made without resort to such information. For example, in one embodiment, the user can explicitly indicate the output device and formatting desired for some or all pieces of output information (e.g., in response to an notification from the system), or another entity (e.g., an application program supplying the output information) can explicitly designate the output device and/or formatting.

Figure 15:
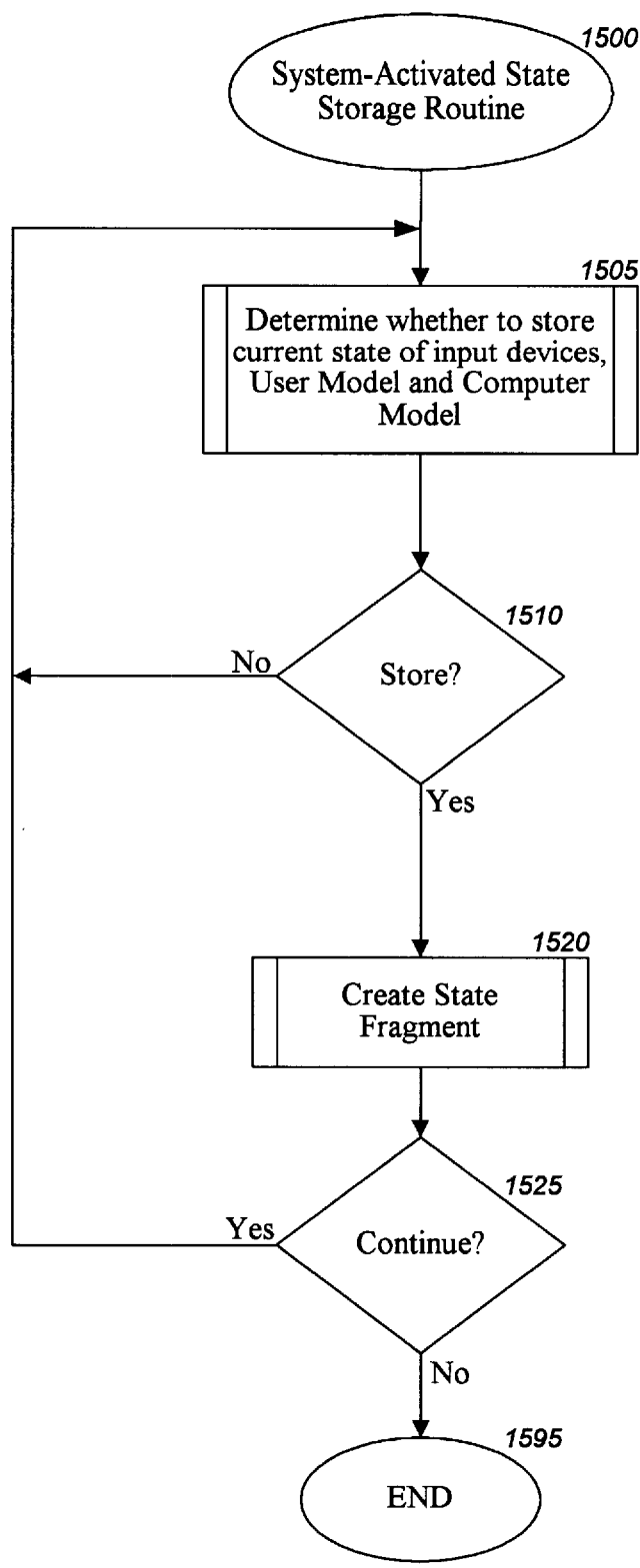
FIG. 15 is an exemplary flow diagram of an embodiment of the System-Activated State Storage routine.

FIG. 15 is an exemplary flow diagram of an embodiment of the System-Activated State Storage routine 1500. The routine automatically determines when an event of interest is occurring for which state information should be stored, retrieves a variety of current state information from input devices, determines additional information to be associated with the retrieved information, and stores the information as a state fragment that is available for later retrieval.

The routine begins at step 1505 where the subroutine Determine Whether To Store Current State Of Input Devices, User Model, and Computer Model is executed to determine if current state information should be stored in a state fragment. The routine then continues to step 1510 to determine if a state fragment is to be created. If not, the routine returns to step 1505, and if so, the routine continues to step 1520. At step 1520, the routine executes the Create State Fragment subroutine to create a state fragment having the appropriate current state information and additional information (e.g., recall tags and annotations). After step 1520, the routine continues to step 1525 to determine whether to create additional state fragments. If so, the routine returns to step 1505, and if not, the routine continues to step 1595 and ends.

Figure 16:
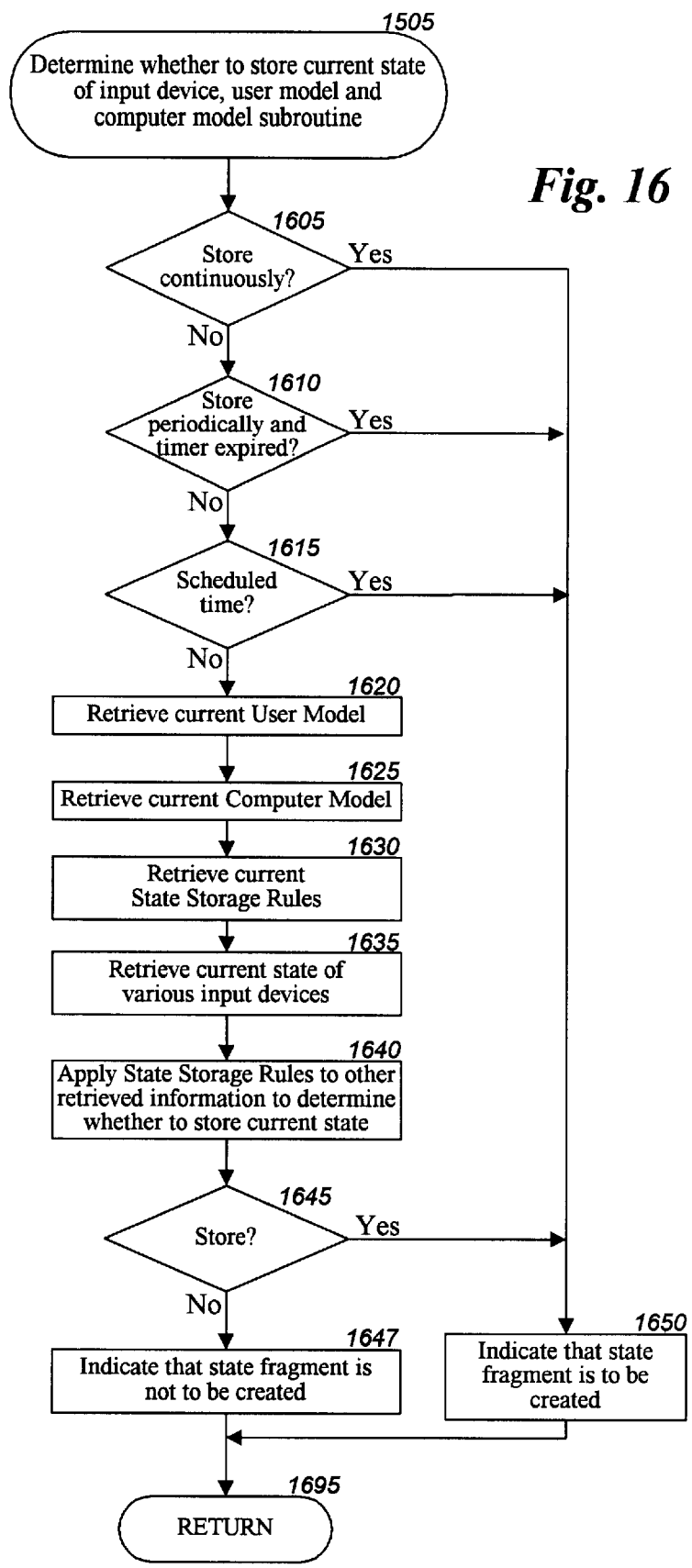
FIG. 16 is an exemplary flow diagram of an embodiment of the Determine Whether To Store Current State Of Input Devices, User Model, And Computer Model subroutine.

FIG. 16 is an exemplary flow diagram of an embodiment of the Determine Whether To Store Current State Of Input Devices, User Model, and Computer Model subroutine 1505. The subroutine determines if current state information should be stored in a state fragment for any of multiple reasons. The subroutine begins at step 1605 where it is determined whether state fragments are being continuously stored so as to maintain a continuous log of events occurring in the environment surrounding the user. If not, the subroutine continues to step 1610 to determine whether state fragments are being periodically created (e.g., based on a timer set for a specified period of time), and if so, whether it is time to now create another state fragment. If not, the subroutine continues to step 1615 to determine whether a state fragment was previously scheduled to be created at this time (e.g., to record a scheduled event). If not, the subroutine continues to step 1620.

At step 1620, the subroutine retrieves the current version of an available user model, and then continues to step 1625 to retrieve the current version of an available computer model. The subroutine then continues to step 1630 to retrieve the current version of an available set of State Storage Rules. After step 1630, the subroutine continues to step 1635 to retrieve the input information available to the current set of input devices. The subroutine then continues to step 1640 to apply the State Storage Rules to the current state information from the user model, computer model, and input devices in order to determine whether an event of interest is currently occurring which warrants the creation of a state fragment. Those skilled in the art will appreciate that there are a variety of ways to use rules to determine when an event of interest is occurring, as well as a variety of other ways to make such a determination.

The subroutine then continues to step 1645 to determine whether it was decided to create a state fragment that stores current state information. If so, or if any of steps 1605, 1610, or 1615 were determined to be yes, the subroutine continues to step 1650 to indicate that a state fragment is to be created. If it is instead determined in step 1645 that a state fragment is not to be created, the subroutine continues instead to step 1647 to indicate that a state fragment is not to be created. After steps 1647 or 1650, the subroutine continues to step 1695 and returns.

Figure 17:
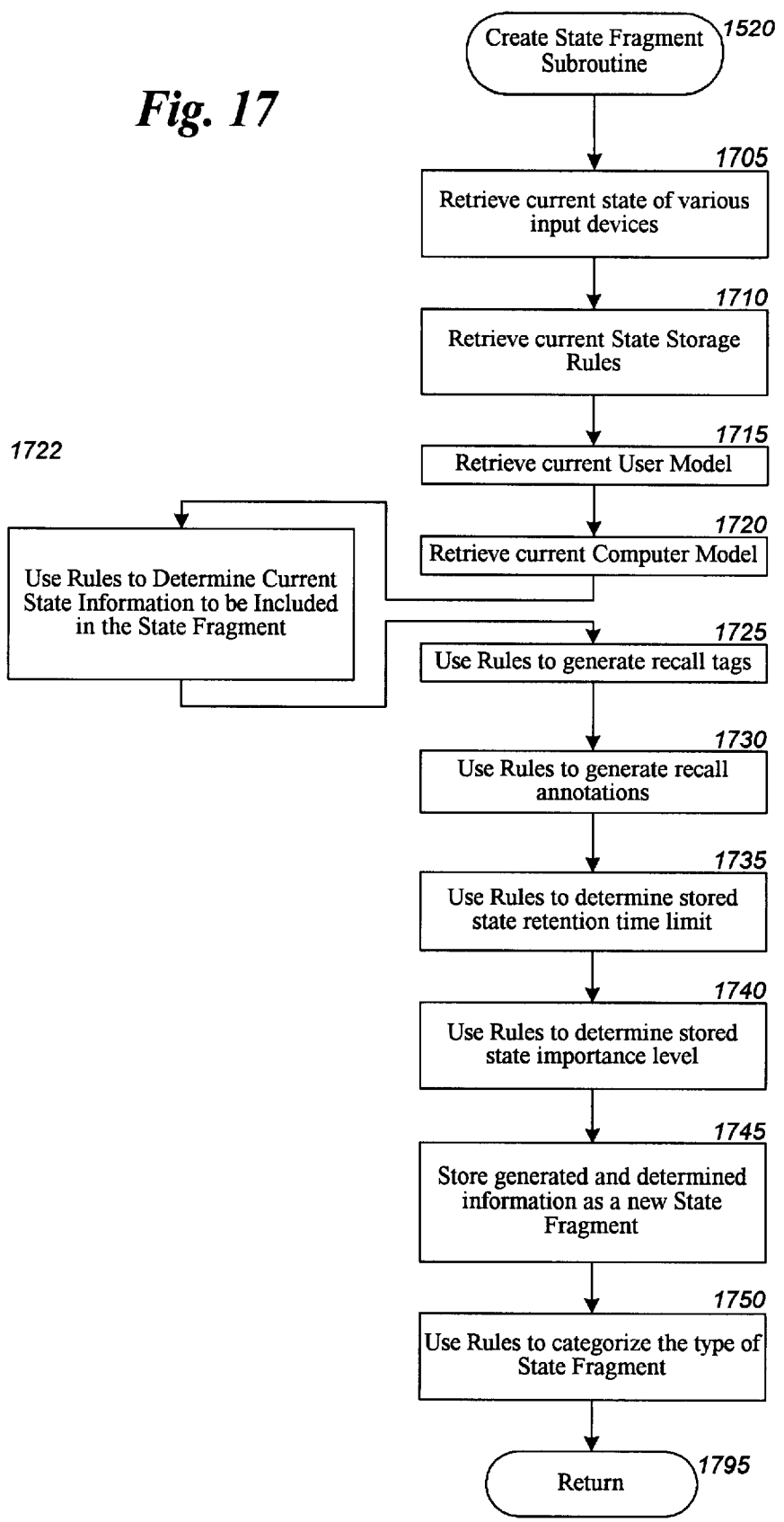
FIG. 17 is an exemplary flow diagram of an embodiment of the Create State Fragment subroutine.

FIG. 17 is an exemplary flow diagram of an embodiment of the Create State Fragment subroutine 1520. The subroutine automatically determines the appropriate current state information to be stored in the state fragment to be created, determines the appropriate additional information to be associated with the state fragment, and then creates the state fragment. The subroutine begins at step 1705 where it retrieves the input information available to the current set of input devices. The subroutine then continues to step 1710 to retrieve the current version of an available set of State Storage Rules. The subroutine next continues to step 1715 to retrieve the current version of an available user model, and then to step 1720 to retrieve the current version of an available computer model.

The subroutine next continues to step 1722 to apply the State Storage Rules to the current state information from the user model, computer model, and input devices in order to determine what information should be stored in the state fragment to be created (e.g., information about the event of interest that triggered the creation of the state fragment). As with other state fragments, information to be stored can include input information received from one or more input devices as well as information from other sources such as available user and computer models. In some embodiments, the stored state fragment can include all current state information which is available, thus capturing a snapshot of the entire current state. Those skilled in the art will appreciate that the appropriate information to be stored can be determined in ways other than using the State Storage Rules. For example, details about what information is to be included in the state fragment may be specified along with the information that triggers the creation of the state fragment, such as when creation of a state fragment including specified types of current state information is scheduled for the current time. Alternately, the details about what information is to be included in the state fragment may be determined in a variety of other ways, such as by using user preference or default information.

After step 1722, the subroutine continues to step 1725 to use the State Storage Rules to generate one or more appropriate recall tags to be associated with the state fragment to be created. The subroutine then continues to step 1730 to use the State Storage Rules to generate one or more annotations to be associated with the state fragment to be created. In step 1735, the subroutine next uses the State Storage Rules to determine a retention time limit for the state fragment to be created, and in step 1740 uses the Rules to determine an importance level for the state fragment. Those skilled in the art will appreciate that the recall tags, annotations, retention time limit, and importance level can also be generated in a variety of ways. For example, derived values for user condition variables in the user model can be used as recall tags or annotations. In addition, those skilled in the art will appreciate that a variety of additional types of information (e.g., an urgency level) can be generated for the state fragment, and that alternate embodiments may not generate some or all of the described types of information for state fragments being created. Moreover, some embodiments may have multiple sets of rules, such as separate sets of rules for determining when a state fragment is to be created, for determining the types of state information to be included in the state fragment, for generating recall tags, for generating annotations, and for generating other types of information to be included in or associated with the state fragment.

After step 1740, the subroutine continues to step 1745 to store the generated and determined information together as a new state fragment. The subroutine then continues to step 1750 to categorize the type of created state fragment. In some embodiments, this category information can be stored in or associated with the state fragment, while in other embodiments the category association may be indicated in other ways (e.g., by storing a copy of or a pointer to the state fragment in a location associated with the category). The subroutine then continues to step 1795 and returns.

Figure 18A:
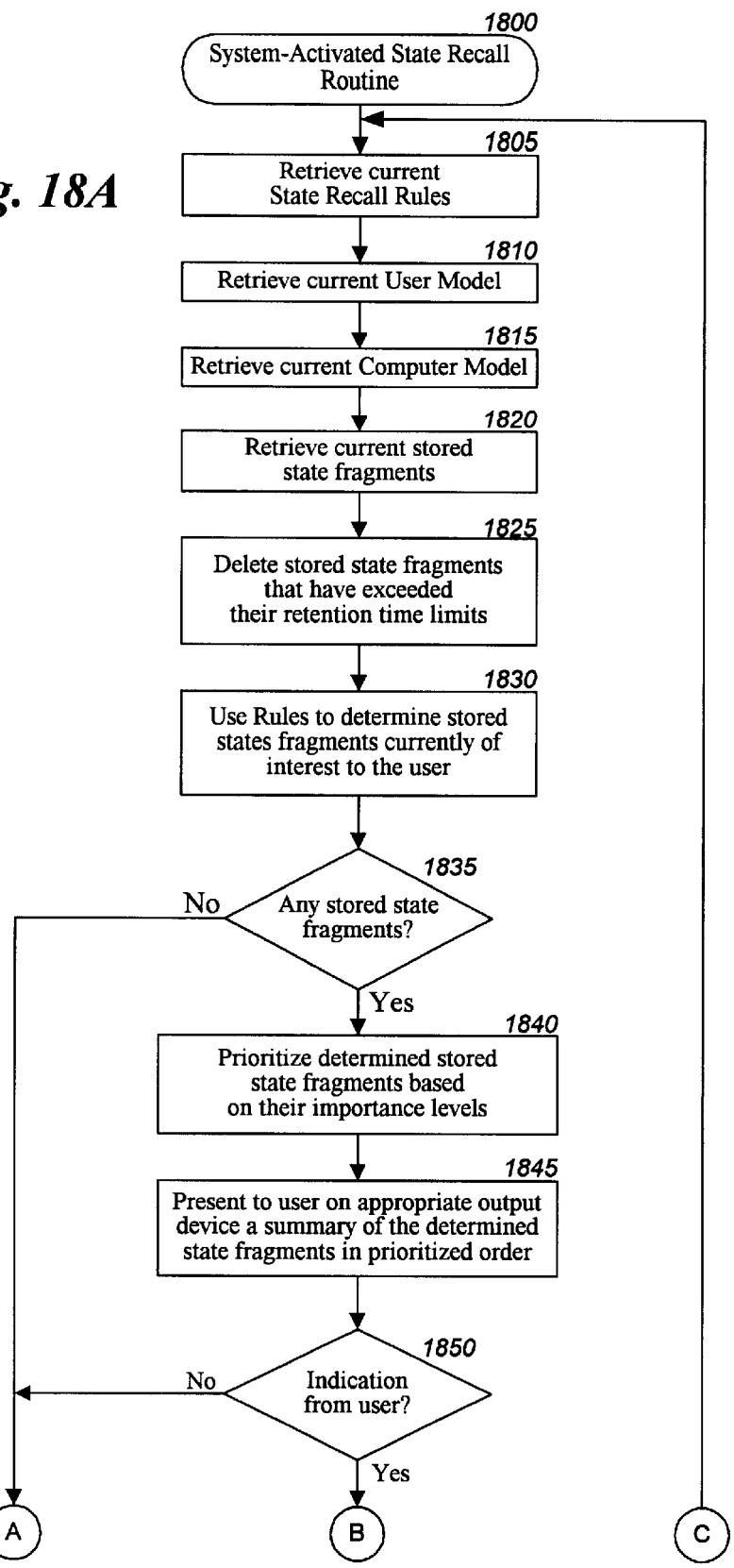
FIGS. 18A and 18B are exemplary flow diagrams of an embodiment of the System-Activated State Recall routine.
Figure 18B:
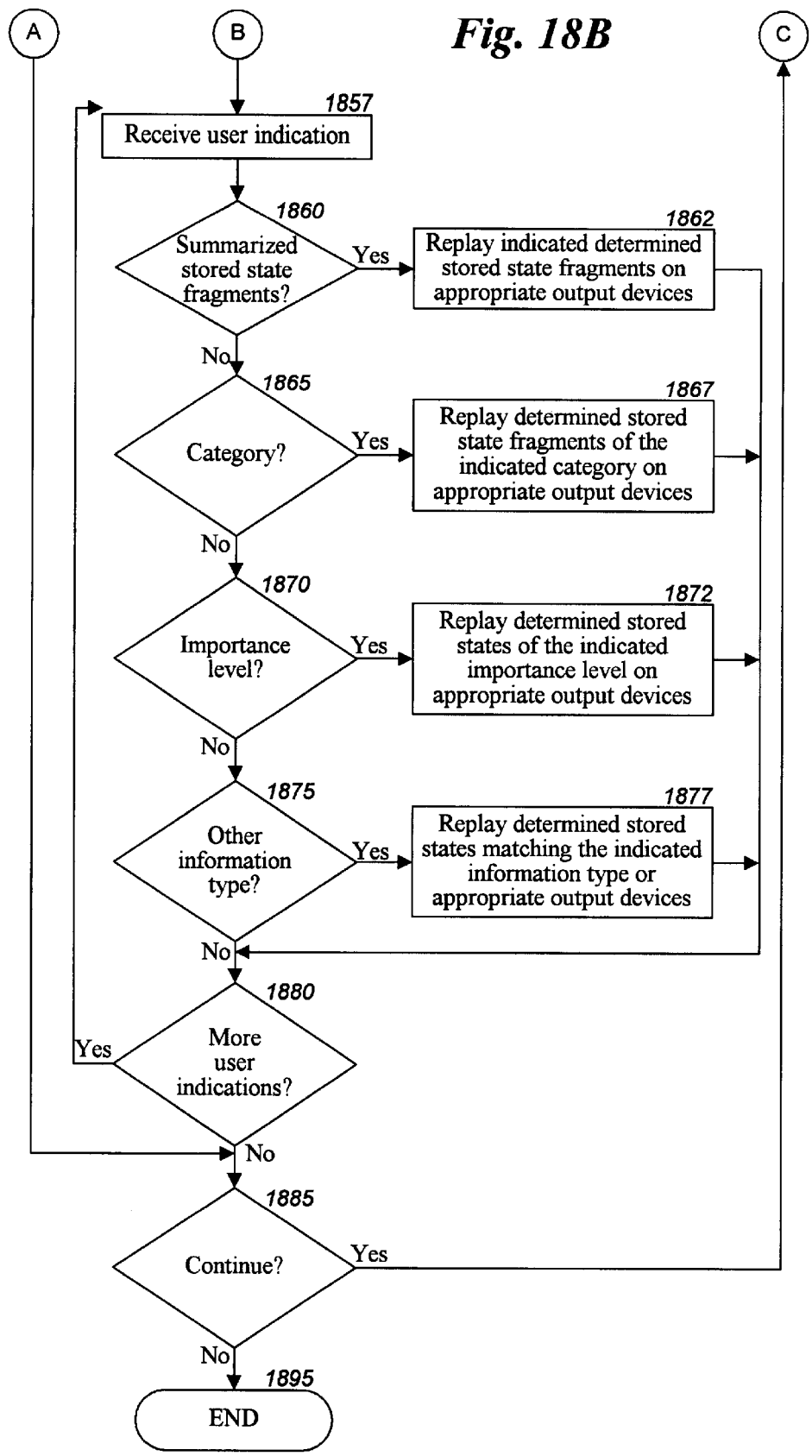

FIGS. 18A and 18B are exemplary flow diagrams of an embodiment of the System-Activated State Recall routine 1800. The routine automatically determines when an event of interest is occurring such that state information from a stored state fragment would be of interest to the user, identifies one or more such state fragments, and then presents to the user some or all of the stored state information from the identified state fragments.

The routine begins at step 1805 where it retrieves the current version of an available set of State Recall Rules. The routine next continues to step 1810 to retrieve the current version of an available user model, and then to step 1815 to retrieve the current version of an available computer model. The routine then continues to step 1820 to retrieve indications of the current stored state fragments. In step 1825, the routine then deletes the stored state fragments that have exceeded their retention time limits. Those skilled in the art will appreciate that deletion of such state fragments can be performed in a variety of ways, or that such state fragments could instead be archived or modified so as to indicate that they have expired. For example, the State Storage Routine can instead identify and delete such stored state fragments, either in addition to or instead of the State Recall Routine. Alternately, an entirely separate routine (e.g., a garbage collection routine) can perform this function.

The routine next continues to step 1830 to use the State Recall Rules to determine stored state fragments that may be of interest to the user based on the current state information. Those skilled in the art will appreciate that there are a variety of ways to use rules to make such a determination. For example, the Rules can determine whether an event of interest is occurring, and then determine whether any stored state fragments are related to the current event of interest. Those skilled in the art will also appreciate that there are a variety of other ways to make such a determination rather than using rules. The routine then continues to step 1835 or to determine whether any stored state fragments were determined to be of current interest. If so, the routine continues to step 1840 to prioritize the determined stored state fragments based on their importance levels. Those skilled in the art will appreciate that the stored state fragments can alternately be prioritized in a variety of other ways, such as based on a probability that the state fragment is currently of interest, on a degree of match with the rules, on the recency of creation of the state fragment, etc.

In steps 1845 through 1880, the routine next presents stored information of interest from the identified state fragments to the user. In particular, after step 1840 the routine continues to step 1845 to present to the user on appropriate output devices a summary of the identified state fragments in the order of their priority. A variety of types of information can be used as a summary, such as annotations, recall tags, time of creation, or other information stored in the state fragments. The routine then continues to step 1850 to determine whether an indication is received from the user to present additional information for one or more of the state fragments. If so, the routine continues to step 1857 to receive the user indication, and then to step 1860 to determine whether the user indicated that they wish to receive additional stored information from one or more of the summarized stored state fragments. If so, the routine continues to step 1862 to replay additional stored information from the indicated state fragments to the user on appropriate output devices. The types of additional information to be presented can be determined in a variety of ways, such as based on explicit user indication, based on user preferences or defaults, or instead all stored information can be presented.

If it was instead determined in step 1860 that the user did not indicate one or more stored state fragments, the routine continues to step 1865 to determine whether the user indicated a category of state fragments for which to receive additional state information. If so, the routine in step 1867 determines the state fragments of the identified category, and then presents additional stored information for those state fragments to the user on appropriate output devices. If it was instead determined in step 1865 that the user did not indicate a category, the routine continues to step 1870 to determine if the user indicated an importance level of state fragments for which to receive additional stored information. If so, the routine continues to step 1872 to determine the state fragments having the indicated importance level, and then presents additional stored information for those state fragments to the user on appropriate output devices. If it was instead determined in step 1870 that the user did not indicate an importance level, the routine continues to step 1875 to determine if the user indicated a specific other type of stored information from the state fragments to be presented. If so, the routine continues to step 1877 to retrieve the indicated type of stored information from the state fragments, and then presents to the user on appropriate output devices the retrieved information.

If it was instead determined in step 1875 that the user did not indicate a specific information type, or after steps 1862, 1867, 1872, or 1877, the routine continues to step 1880 to determine if there are more user indications to receive. If so, the routine returns to step 1857. If it was instead determined in step 1880 that there are not more user indications, or if it was determined in steps 1835 or 1850 that there were not any stored state fragments or that no indications were received from the user, the routine continues to step 1885 to determine whether additional state fragments should be recalled. If so, the routine returns to step 1805, and if not the routine ends in step 1895.

Those skilled in the art will appreciate that in alternate embodiments, state fragment information can be presented to the user without any explicit user indications in a variety of ways, such as by presenting all of the stored state information for each of the identified state fragments in order of priority to the user, by presenting a determined set of the stored state information for the state fragment with the highest priority to the user, by presenting based on the order created or the proximity to current location, etc. Conversely, the user can be queried before any information is presented. Those skilled in the art will also appreciate that a variety of other types of indications can be received from the user.

As discussed above, state fragments can be created based either on explicit user indications or on system-generated indications, and previously stored state fragments can be presented to the user based either on explicit user indications or on system-generated indications. Those skilled in the art will appreciate that in some embodiments these two types of state fragments will be treated separately such that user-created state fragments will be recalled only by explicit user indications, and similarly that system-created state fragments will be recalled only by system-generated indications. In alternate embodiments, these two types of state fragments will be treated interchangeably such that user-created state fragments can be recalled by system-generated indications and system-created state fragments can be recalled by user-generated indications. Those skilled in the art will also appreciate that in some embodiments only one of the two types of ways of creating state fragments may be available, and that in other embodiments only one of the two types of ways of recalling state fragments may be available.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method in a computer to assist a user in recalling a previous environment of the user, the computer having input devices capable of recording audio and video information from the environment and having output devices capable of presenting audio and video information, the method comprising:

receiving a plurality of indications from the user, each received indication to store a state fragment having information about a current state of an environment of the user, the indications received by a State Storage Module executing on the computer;

for each of the plurality of received indications, storing a state fragment by, recording video information from the environment using at least one of the input devices;

recording at least one audio recall tag from the user using at least one of the input devices, the recall tag related to a subject of the recorded video information, the recording performed under control of the State Storage Module;

recording at least one audio annotation from the user using at least one of the input devices, the annotation providing descriptive information about the recorded video information, the recording performed under control of the State Storage Module; and creating a stored state fragment having the recorded video information, the recorded audio recall tags, and the recorded audio annotations, the creating performed by the State Storage Module; and when the user indicates to present stored information from one of the stored state fragments in order to assist the user in recalling the environment of the user at the time of the storing of that state fragment, recalling a stored state fragment by, receiving from the user an indication of a subject, the indication of the subject received by a State Recall Module executing on the computer;

comparing the indicated subject to the recall tags of the stored state fragments, the comparing performed by the State Recall Module; and when the indicated subject matches a recall tag of one of the stored state fragments, under control of the State Recall Module, presenting to the user on at least one of the output devices the recorded video information of the one stored state fragment; and presenting to the user on at least one of the output devices the recorded audio annotations of the one stored state fragment, so that the user can recall video and annotation information for a previous state of an environment of the user.

2. The method of claim 1 wherein the indicated subject matches a recall tag of multiple of the stored state fragments, and wherein the presenting of the recorded video information and of the recorded audio annotation is performed for each of the multiple stored state fragments.

3. The method of claim 1 wherein the indicated subject matches a recall tag of multiple of the stored state fragments, and wherein the presenting of the recorded video information and of the recorded audio annotation is performed for a stored state fragment having a highest degree of matching.

4. The method of claim 1 including:

for each of a plurality of indications generated automatically by the computer without human intervention, storing a state fragment by, recording video information from the environment using at least one of the input devices;

receiving a computer-generated recall tag related to a subject of the recorded video information;

receiving a computer-generated annotation providing descriptive information about the recorded video information; and creating a stored state fragment having the recorded video information, received recall tag, and received annotation.

5. The method of claim 1 including:

when the computer automatically indicates without human intervention that one of the stored state fragments is to be recalled, recalling a stored state fragment by, receiving a computer-generated indication of a subject;

comparing the indicated subject to the recall tags of the stored state fragments; and when the indicated subject matches a recall tag of one of the stored state fragments, presenting to the user on at least one of the output devices the recorded video information of the stored state fragment having the matching recall tag; and presenting to the user on at least one of the output devices the recorded audio annotations of the stored state fragment having the matching recall tag.

6. The method of claim 1 including deleting the one stored state fragment after the recalling of that state fragment.

7. The method of claim 1 including, after the storing of the one state fragment and before the recalling of that state fragment, manipulating the information stored in that state fragment.

8. The method of claim 1 including, after the storing of the state fragments, indexing the stored state fragments based on the recall tags to facilitate later recall of a state fragment matching a specified recall tag.

9. A computer-implemented method for facilitating later recall by a user of a prior state of an environment external to the user, the method comprising:

storing information about a current state of the environment by, recording information from the environment with at least one input device of the computer;

receiving an indication of a recall tag to assist in later retrieval of the recorded information from the environment, the indication received by an executing State Storage Module;

receiving an indication of descriptive information about the environment the indication received by the State Storage Module; and associating the indicated recall tag and the indicated descriptive information with the recorded environment information, the associating performed under control of the State Storage Module, so that if the recall tag is later supplied, the recorded environment information and the descriptive information can be presented to augment the memory of the user of the state of the environment at the time of the storing.

10. The method of claim 9 wherein the storing of the information about the current state is in response to an indication from the user.

11. The method of claim 9 wherein the storing of the information about the current state is in response to an indication generated automatically without human intervention.

12. The method of claim 9 including, after the storing of the information about the current state, presenting to the user the stored information about the current state in response to a received indication matching the tag.

13. The method of claim 9 wherein the tag is textual information.

14. The method of claim 9 wherein the tag is audio information.

15. The method of claim 9 wherein the tag is video information.

16. The method of claim 9 wherein the stored information about the current state includes sensed information about a current state of the user.

17. The method of claim 9 wherein the stored information about the current state includes input information received from the user.

18. The method of claim 9 wherein the stored information about the current state includes information about a current state of the computer.

19. The method of claim 9 including storing information about a plurality of states of the environment.

20. A method in a computer for facilitating later recall by a user of a previous state, the method comprising:

in response to each of a plurality of indications from the user, storing a group of information about a current state by,
receiving from the user an indication of at least one input sensor of the computer,
recording information about the current state with the indicated input sensors;
receiving from the user an indication of a topic related to the current state to assist in later retrieval, the indication received by a State Storage Module of the computer;
receiving from the user an indication of information describing the current state, the indication received by the State Storage Module; and
associating the indicated topic and the indicated descriptive information with the recorded information, the associating performed under control of the State Storage Module; and indexing the stored groups of information in order to facilitate later retrieval of a stored group of information.

21. The method of claim 20 including:

receiving information from the user to identify one of the stored groups of information;
identifying the one of the stored groups by using the received information and the indexing; and
presenting to the user information from the identified stored group.

22. The method of claim 20 wherein the recorded information about the current state includes sensed information about an environment of the user.

23. The method of claim 20 wherein the stored groups of information include information about a current state of the computer.

24. A method in a computer for facilitating later recall by a user of a previous state, the method comprising:

monitoring the user to collect a group of information about a current state of the user;
monitoring an environment of the user to collect a group of information about a current state of the environment; and
without user intervention,
determining based on the collected groups of information a level of user interest in at least one of the current state of the user and the current state of the environment, the determining performed by an executing User Modeling Module; and
when the level of user interest in at least one of the current states is determined to exceed a threshold, storing information about at least one of the current states by,
recording information about at least one of the current states with at least one input sensor of the computer;
determining a topic related to the recorded information, the determining performed under control of an executing State Storage Module; and
associating the determined topic with the recorded information, the associating performed under control of the State Storage Module, so that the stored information can later be presented to the user to assist the user in recalling the current states at the time of the recording.

25. The method of claim 24 including:

after the storing of the information,
receiving information that identifies the stored information; and
presenting to the user the stored information.

26. The method of claim 24 wherein the determined topic is a recall tag to be later used in identifying the stored information.

27. The method of claim 24 including, without user intervention, determining information describing the recorded information and associating the determined descriptive information with the determined topic and the recorded information.

28. A computer-implemented method for facilitating recall by a user of a previous state, the method comprising:

storing information about a current state by,
recording information from an environment external to the user with at least one input device of the computer;
recording information from the user with at least one input device of the computer;
receiving an indication of a recall tag related to the current state, the indicated recall tag to be used for later retrieval of the recorded environment information and the recorded user information, the indication received by an executing State Storage Module; and
associating the indicated recall tag with the recorded environment information and the recorded user information, the associating performed under control of the State Storage Module, so that if the recall tag is later supplied, the recorded environment information and the recorded user information can be used to augment the memory of the user of the state at the time of the storing.

29. The method of claim 28 wherein the recorded information from the user includes sensed information about the user.

30. The method of claim 28 wherein the recorded information from the user includes information input by the user.

31. The method of claim 28 including associating a received annotation with the stored information.

32. A method for assisting a user of a wearable computer in recalling a past state of the user, the wearable computer having a plurality of input devices, the method comprising;
receiving a plurality of indications to store information about a current state;
for each of the plurality of received indications, storing a state fragment by,
recording sensed information about an environment external to the user from one of the input sensor devices,
recording sensed information about the user from one of the input sensor devices; and
associating the recorded environment information and the recorded user information as the stored state fragment, the associating performed under control of a State Storage Module of the wearable computer; and
augmenting the memory of the user of a past state by,
receiving an indication of a topic of interest to the user;
identifying at least one stored state fragment having information related to the topic of interest, the identifying performed under control of a State Recall Module of the wearable computer; and
presenting to the user the recorded environment information and the recorded user information associated with the identified state fragment.

33. A computer-readable medium whose contents cause a computer to facilitate providing information to a user about an environment external to the user, by performing a method comprising:
storing information about a current state of the environment by,
recording information from the environment with at least one input device of the computer;
receiving an indication of a recall tag related to the environment, the indication received by a State Storage Module of the computer;
receiving an indication of descriptive information about the environment, the indication received by the State Storage Module; and
associating the indicated recall tag and the indicated descriptive information with the recorded environment information, the associating performed under control of the State Storage Module,
so that if the recall tag is later supplied, the recorded environment information and the descriptive information about the environment can be provided to the user.

34. The computer-readable medium of claim 33 wherein the tag is audio information.

35. The computer-readable medium of claim 33 wherein the tag is video information.

36. The computer-readable medium of claim 33 wherein the stored information about the current state includes sensed information about a current state of the user.

37. The computer-readable medium of claim 33 wherein the stored information about the current state includes information about a current state of the computer.

38. A computer system for reminding a user of a prior environment external to the user, comprising:
a state storage module that stores information about a current state of the environment by recording information from the environment with at least one input device of the computer system, by receiving an indication of a recall tag related to the environment for use in later retrieval of the recorded information, by receiving an indication of descriptive information about the environment, and by associating the indicated recall tag and the indicated descriptive information with the recorded environment information; and
a storage means for storing the information about the current state of the environment for later providing to a user after receipt of the recall tag.

39. The computer system of claim 38 including a state recall module that receives information from the user to identify one of the stored groups of information, and that presents to the user information from the identified one of the stored groups.

40. The computer system of claim 38 including a user modeling module that monitors the user and an environment of the user to collect a group of information about a current state, and that determines based on the monitoring when to store information about the current state of the environment.

41. A data structure stored in memory of a computer for use in facilitating recall by a user of a previous state of the user at a previous time, the data structure including a group of associated information that describes the previous state by comprising:
stored information about an environment external to the user that was sensed by an input sensor device of the computer at the previous time;
stored information from the user that was received by an input device of the computer at the previous time; and
a recall tag from a State Storage Module for identifying the stored environment information and the stored user information that was received,
so that if tile recall tag is supplied, the stored environment information and the stored user information can be provided to the user to facilitate recall of the previous state at the previous time.

42. The data structure of claim 41 including an annotation that describes the environment information and the user information.

43. The data structure of claim 41 including information about a state of the computer at the previous time.

44. The data structure of claim 41 wherein the user information includes sensed information about the user at the previous time.

45. The data structure of claim 41 wherein the user information includes information input by the user at the previous time.

46. A generated data signal transmitted via a data transmission medium, the generated data signal having encoded contents that cause a computing device to assist a user in recalling a previous state at a previous time, the encoded contents of the data signal including a group of associated information that describes the previous state by comprising:
information about an environment external to the user that was sensed by an input sensor device of the computer at the previous time;
information from the user that was received by an input device of the computer at the previous time; and
a recall tag from a State Storage Module for identifying the environment information and the information from the user,
so that if the recall tag is supplied, the environment information and the user information can be presented to the user to assist in recalling the previous state at the previous time.

47. The data signal of claim 46 including an annotation that describes the environment information and the user information.

48. The data signal of claim 46 including information about a state of the computer at the previous time.

* * * * *

UNITED STATES PATENT AND TRADEMARK OFFICE
CERTIFICATE OF CORRECTION

PATENT NO. : 6,513,046 B1  Page 1 of 1
DATED : January 28, 2003
INVENTOR(S) : Kenneth H. Abbott, III et al.

It is certified that error appears in the above-identified patent and that said Letters Patent is hereby corrected as shown below:

Column 1,
Line 43, "e.g," should be -- e.g., --;

Column 19,
Line 24, "e.g," should be -- e.g., --;

Column 20,
Line 16, "e.g." should be -- e.g., --;

Column 29,
Line 42, "e.g," should be -- e.g., --;

Column 36,
Line 64, insert a comma between "environment" and "the";

Column 37,
Line 41, insert comma after "computer";

Column 39,
Line 10, "comprising;" should be -- comprising: --;
Line 17, "devices," should be -- devices; --;

Column 40,
Line 36, "tile" should be -- the --.

Signed and Sealed this

Fifteenth Day of April, 2003

JAMES E. ROGAN
*Director of the United States Patent and Trademark Office*